United States Patent
Guo et al.

(10) Patent No.: US 10,306,549 B2
(45) Date of Patent: *May 28, 2019

(54) ACCESS CONTROL METHOD AND DEVICE

(71) Applicant: Huawei Technologies Co., Ltd., Shenzhen (CN)

(72) Inventors: Yali Guo, Shenzhen (CN); Wanqiang Zhang, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,727

(22) Filed: Oct. 31, 2017

(65) Prior Publication Data

US 2018/0054778 A1    Feb. 22, 2018

Related U.S. Application Data

(63) Continuation of application No. 14/937,062, filed on Nov. 10, 2015, now Pat. No. 9,877,274, which is a
(Continued)

(51) Int. Cl.
*H04W 48/16* (2009.01)
*H04W 76/10* (2018.01)
(Continued)

(52) U.S. Cl.
CPC ....... *H04W 48/16* (2013.01); *H04W 28/0284* (2013.01); *H04W 28/0289* (2013.01); *H04W 48/02* (2013.01); *H04W 76/10* (2018.02)

(58) Field of Classification Search
None
See application file for complete search history.

(56) References Cited

U.S. PATENT DOCUMENTS 9,084,074 B2 *   7/2015   Jang .................. H04W 4/70
2012/0039171 A1 *   2/2012   Yamada .............. H04L 47/12
                                                            370/232
(Continued)

FOREIGN PATENT DOCUMENTS

CN     101925151 A    12/2010
CN     102892177 A     1/2013
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0, Mar. 2013, 209 pages.
(Continued)

*Primary Examiner* — Hong S Cho
(74) *Attorney, Agent, or Firm* — Slater Matsil, LLP

(57) ABSTRACT

An access control method, including obtaining, by a protocol-stack upper layer of a terminal, an override identifier, starting, by the protocol-stack upper layer of the terminal, an application specific congestion control for data connectivity (ACDC) check according to a service initiated by the terminal, and, if the protocol-stack upper layer of the terminal confirms that the service initiated by the terminal can pass the ACDC check and determines that the override identifier corresponding to an application identifier of the service passing the ACDC check is overriding an access class barring (ACB) check, sending, by the protocol-stack upper layer of the terminal, an radio resource control (RRC) establishment request message to an access layer of the terminal, where the request message carries an indication of not performing an ACB check.

9 Claims, 13 Drawing Sheets

Related U.S. Application Data continuation of application No. PCT/CN2013/075562, filed on May 13, 2013.

(51) Int. Cl.
*H04W 28/02* (2009.01)
*H04W 48/02* (2009.01)

(56) References Cited

U.S. PATENT DOCUMENTS

| | | | |
|---|---|---|---|
| 2013/0040605 A1* | 2/2013 | Zhang | H04W 48/06 455/411 |
| 2013/0089029 A1 | 4/2013 | Jang et al. | |
| 2014/0099912 A1 | 4/2014 | Lee et al. | |

FOREIGN PATENT DOCUMENTS

| | | |
|---|---|---|
| JP | 2011151843 A | 8/2011 |
| JP | 2012529806 A | 11/2012 |
| KR | 20130018139 A | 2/2013 |
| RU | 2461150 C1 | 9/2012 |
| WO | 2012020338 A1 | 2/2012 |
| WO | 2012092071 A1 | 7/2012 |
| WO | 2012136311 A1 | 10/2012 |
| WO | 2013022298 A2 | 2/2013 |
| WO | 2013025732 A1 | 2/2013 |
| WO | 2013051840 A2 | 4/2013 |

OTHER PUBLICATIONS

"3rd Generation Partnership Project; Technical Specification Group Services and System Aspects; Study on Application Specific Congestion Control for Data Communication (Release 12)," 3GPP TR 22.806, V0.2.0, Nov. 2011, 8 pages.

"3rd Generation Partnership Project; Technical Specification Group Services and System Aspects; Service Accessibility (Release 12)," 3GPP TS 22.011, V12.0.0, Mar. 2013, 26 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.3.0, Mar. 2013, 344 pages.

"Application-Specific Congestion Control for Data Connectivity (ACDC)," S1-122109, NTT docomo, Shin-ichi Isobe, NTT Docomo, inc, Downloaded by EPO on Dec. 31, 2012, 11 pages.

"ACDC Activation for UE-Initiated Applications, Dependent on Subscription," Agenda Item: 9.5, Source: NTT DOCOMO, Contact: Atsushi Minokuchi, 3 GPP TSG-SA WG1 #60, S1-124124, Edinburgh, UK, Nov. 12-16, 2012, 2 pages.

"Enhancement of SSAC to Include Requirements for ACDC," Agenda Item: 5.2, Source: Research in Motion UK Ltd., Contact: Nick Russell, 3 GPP TSG-SA WG1 #61, S1-131047, Prague, Czech Republic, Jan. 28-Feb. 1, 2013, 2 pages.

"Requirements Applied to Heavy Congestion Scenarios of ACDC," Source to WG: NTT DOCOMO, China Mobile, KDDI, KT, LG Uplus, NTT, TeliaSonera, Fujitsu, Hltachi, Huawei, Intel, LG Electronics, NEC, NTC, Panasonic, Samsung, Sharp, Source to TSG: SA1, Work Item Code: TBD, Category: B, Release: Rel-12, Change Request, 22.011 CR 0193, Revision 1, Current Version: 11.2.0, 3GPP TSG-SA WG1 Meeting #61, S1-131084, Jan. 28-Feb. 1, 2013, 3 pages.

"Requirements Applied to Heavy Congestion Scenarios ACDC," Change Request 22.011, CR 0193, Revision 2, Current Version: 11.2.0, S1-131143, Prague, Czech Republic, Jan. 28-Feb. 1, 2013, 2 pages.

"Requirements for Application and Service Access Control," 3GPP TSG-SA WG1 Meeting #62, S1-133056, Change Request, 22.011, CR 0193, Revision 5, Current Version: 12.0.0, New Delhi, India, May 6-10, 2013, 4 pages.

\* cited by examiner

ACCESS CONTROL METHOD AND DEVICE

CROSS-REFERENCE TO RELATED APPLICATIONS

This application is a continuation of U.S. patent application Ser. No. 14/937,062, filed on Nov. 10, 2015, which is a continuation of International Patent Application No. PCT/CN2013/075562 filed on May 13, 2013, all of the aforementioned patent applications are hereby incorporated by reference in their entireties.

TECHNICAL FIELD

The present invention relates to communications technologies, and in particular, to an access control method and a device.

BACKGROUND

Currently, mobile Internet applications are developing rapidly, and a mobile phone terminal can easily download and install various applications. Because downloading and installing of applications worsening congestion on a network side, the network side prohibits access of some applications to a network when the network is congested. However, when some natural disasters occur, an operator hopes that in a network congestion scenario, access connections can still be provided for particular applications (such as a disaster information bulletin board service or a disaster voice information service) while other applications are prohibited to ensure that there are sufficient resources for the particular applications.

Therefore, the 3GPP provides two access control mechanisms. One is an application specific congestion control for data connectivity (ACDC) mechanism, which is used to allow or restrict a particular application. The other is an access class barring (ACB) control mechanism, which is used to reduce access load in the case of network congestion.

The network side starts the ACDC and ACB access control mechanisms at the same time. When a terminal in an idle state initiates a service, the terminal must pass ACDC and ACB checks before initiating the service. However, in some special cases, even if the terminal cannot pass the ACB check, it is still hoped that services of some particular applications (for example, a disaster information bulletin board service) can be performed, but the existing mechanisms cannot meet this requirement. As a result, when services of some particular applications need to be performed, because the terminal cannot use the services of the particular applications, safety of a user cannot be ensured.

SUMMARY

In view of this, embodiments of the present invention provide an access control method and a device, so that when a network side starts ACDC check and ACB check access control mechanisms at the same time, a terminal can provide an access connection for a particular application without performing an ACB check.

According to a first aspect, an access control method includes obtaining, by a protocol-stack upper layer of a terminal, an override identifier, starting, by the protocol-stack upper layer of the terminal, an application specific congestion control for data connectivity ACDC check according to a service initiated by the terminal, and if the protocol-stack upper layer of the terminal confirms that the service initiated by the terminal can pass the ACDC check and determines that the override identifier corresponding to an application identifier of the service passing the ACDC check is overriding an access class barring ACB check, sending, by the protocol-stack upper layer of the terminal, a radio resource control (RRC) establishment request message to an access layer of the terminal, where the request message carries an indication of not performing an ACB check, or, if the protocol-stack upper layer of the terminal confirms that the service initiated by the terminal can pass the ACDC check and determines that the override identifier corresponding to an application identifier of the service passing the ACDC check is not overriding an ACB check, sending, by the protocol-stack upper layer of the terminal, an RRC establishment request message to an access layer of the terminal, so that the access layer of the terminal establishes an RRC connection after confirming the ACB check.

With reference to the first aspect, in a first possible implementation manner of the first aspect, the obtaining, by a protocol-stack upper layer of a terminal, an override identifier includes: receiving, by the protocol-stack upper layer of the terminal, an override identifier sent by a core network device; or receiving, by the protocol-stack upper layer of the terminal, a service list sent by a core network device, where the service list carries an override identifier; or receiving, by the protocol-stack upper layer of the terminal, a service list sent by the access layer of the terminal, where the service list carries an override identifier; or receiving, by the protocol-stack upper layer of the terminal, an override identifier, which is sent by the wireless access network device by using the access layer of the terminal; or obtaining, by the protocol-stack upper layer of the terminal, a locally configured coverage identifier; or obtaining, by the protocol-stack upper layer of the terminal, a locally configured service list, where the service list carries an override identifier.

With reference to the first possible implementation manner of the first aspect, in a second possible implementation manner of the first aspect, after the protocol-stack upper layer of the terminal confirms that the service initiated by the terminal can pass the ACDC check, the method further includes: determining, by the protocol-stack upper layer of the terminal according to the override identifier corresponding to the application identifier of the service passing the ACDC check, whether the ACB check needs to be performed.

With reference to the first or second possible implementation manner of the first aspect, in a third possible implementation manner of the first aspect, before the starting, by the protocol-stack upper layer of the terminal, the ACDC check according to a service initiated by the terminal, the method further includes: if the terminal is in an idle state, receiving, by the protocol-stack upper layer of the terminal, a system broadcast message sent by the access layer of the terminal, and notifying the protocol-stack upper layer of the terminal of starting the ACDC check, where the system broadcast message is sent by the wireless access network device after the wireless access network device learns that the wireless access network device and/or the core network device is congested, and starts the ACDC check; or if the terminal is in a connected state, receiving, by the protocol-stack upper layer of the terminal, dedicated signaling sent by the access layer of the terminal, and notifying the protocol-stack upper layer of the terminal of starting the ACDC check, where the dedicated signaling is sent by the wireless access network device after the wireless access network device learns that the wireless access network device and/or the core network device is congested, and starts the ACDC.

According to a second aspect, an access control method is provided, including storing, by an access layer of a terminal, an override identifier sent by a wireless access network device; sending, by the access layer of the terminal, an ACDC check starting notification; after a service initiated by the terminal passes an ACDC check, receiving, by the access layer of the terminal, an RRC establishment request; and if the access layer of the terminal determines that the stored coverage identifier is overriding an ACB check, establishing an RRC connection; or if the access layer of the terminal determines that the stored coverage identifier is not overriding an ACB check, starting the ACB check, and establishing an RRC connection after the ACB check is passed.

With reference to the second aspect, in a first possible implementation manner of the second aspect, before the storing, by an access layer of a terminal, an override identifier sent by a wireless access network device, the method further includes: receiving, by the access layer of the terminal, the ACDC check starting notification, a service list, and the override identifier that are sent by the wireless access network device; or receiving, by the access layer of the terminal, the ACDC check starting notification and the override identifier that are sent by the wireless access network device.

According to a third aspect, an access control method is provided, including: sending, by an access layer of a terminal, an ACDC check starting notification; after a service initiated by the terminal passes an ACDC check, receiving, by the access layer of the terminal, an RRC establishment request, where the RRC establishment request carries an override identifier corresponding to an application identifier of the service passing the ACDC check; and if the access layer of the terminal determines that the override identifier is overriding an ACB check, establishing an RRC connection; or if the access layer of the terminal determines that the override identifier is not overriding an ACB check, starting the ACB check, and establishing an RRC connection after the ACB check is passed.

With reference to the second aspect, in a first possible implementation manner of the second aspect, before the sending, by an access layer of a terminal, an ACDC check starting notification, the method further includes: receiving, by the access layer of the terminal, the ACDC check starting notification, a service list, and the override identifier that are sent by a wireless access network device; or receiving, by the access layer of the terminal, the ACDC check starting notification and the override identifier that are sent by a wireless access network device.

According to a fourth aspect, an access control method is provided, including receiving, by an access layer of a terminal, an ACDC check starting notification; receiving, by the access layer of the terminal, an RRC establishment request message; and if the RRC establishment request message carries an indication of not performing an ACB check, establishing, by the access layer of the terminal, an RRC connection; or if the RRC establishment request message carries an indication of performing an ACB check, performing, by the access layer of the terminal, an ACB check, and establishing an RRC connection after the ACB check is passed.

According to a fifth aspect, a terminal is provided, where the terminal includes: an obtaining module, configured to obtain, by a protocol-stack upper layer, an override identifier; a processing module, configured to start, by the protocol-stack upper layer, an application specific congestion control for data connectivity ACDC check according to a service initiated by the terminal, a determining module, configured to confirm, by the protocol-stack upper layer, that the service initiated by the terminal can pass the ACDC check, and determine that the override identifier that corresponds to an application identifier of the service passing the ACDC check and is obtained by the obtaining module is overriding an access class barring ACB check, and a sending module, configured to after the determining module determines that the override identifier is overriding the access class barring ACB check, send, by the protocol-stack upper layer, an RRC establishment request message to an access layer of the terminal, where the request message carries an indication of not performing an ACB check, where the determining module is configured to confirm, by the protocol-stack upper layer, that the service initiated by the terminal can pass the ACDC check, and determine that the override identifier that corresponds to the application identifier of the service passing the ACDC check and is obtained by the obtaining module is not overriding the ACB check; and the sending module is configured to: after the determining module determines that the override identifier is not overriding the ACB check, send, by the protocol-stack upper layer, an RRC establishment request message to the access layer of the terminal, so that the access layer establishes an RRC connection after confirming the ACB check.

With reference to the fifth aspect, in a first possible implementation manner of the fifth aspect, the obtaining module is specifically configured to: receive, by the protocol-stack upper layer, an override identifier sent by a core network device; or receive, by the protocol-stack upper layer, a service list sent by a core network device, where the service list carries an override identifier, or receive, by the protocol-stack upper layer, a service list sent by the access layer of the terminal, where the service list carries an override identifier; or receive, by the protocol-stack upper layer, an override identifier, which is sent by the wireless access network device by using the access layer of the terminal; or obtain, by the protocol-stack upper layer, a locally configured coverage identifier; or obtain, by the protocol-stack upper layer, a locally configured service list, where the service list carries an override identifier.

With reference to the first possible implementation manner of the fifth aspect, in a second possible implementation manner of the fifth aspect, the terminal further includes: a judging module, configured to determine, by the protocol-stack upper layer according to the override identifier that corresponds to the application identifier of the service passing the ACDC check and is obtained by the obtaining module, whether the ACB check needs to be performed.

With reference to the first or second possible implementation manner of the fifth aspect, in a third possible implementation manner of the fifth aspect, the terminal further includes: a receiving module, configured to receive, by the protocol-stack upper layer, a system broadcast message sent by the access layer of the terminal, and notify the protocol-stack upper layer of the terminal of starting the ACDC check, where the system broadcast message is sent by the wireless access network device after the wireless access network device learns that the wireless access network device and/or the core network device is congested, and starts the ACDC check; or configured to receive, by the protocol-stack upper layer, dedicated signaling sent by the access layer of the terminal, and notify the protocol-stack upper layer of the terminal of starting the ACDC check, where the dedicated signaling is sent by the wireless access network device after the wireless access network device learns that the wireless access network device and/or the core network device is congested, and starts the ACDC.

According to a sixth aspect, a terminal includes: a receiving module, configured to receive, by an access layer, an ACDC check starting notification, and configured to receive, by the access layer, an RRC establishment request message, and a processing module, configured to: if the RRC establishment request message received by the receiving module carries an indication of not performing an ACB check, establish, by the access layer of the terminal, an RRC connection, or configured to, if the RRC establishment request message received by the receiving module carries an indication of performing an ACB check, perform, by the access layer of the terminal, an ACB check, and establish an RRC connection after the ACB check is passed.

According to a seventh aspect, a terminal includes a processor, configured to obtain, by a protocol-stack upper layer, an override identifier, where the processor is configured to start, by the protocol-stack upper layer, an application specific congestion control for data connectivity ACDC check according to a service initiated by the terminal, and the processor is configured to confirm, by the protocol-stack upper layer, that the service initiated by the terminal can pass the ACDC check, and determine that the obtained coverage identifier corresponding to an application identifier of the service passing the ACDC check is overriding an access class barring ACB check; and a transmitter, configured to, after the processor determines that the override identifier is overriding the access class barring ACB check, send, by the protocol-stack upper layer, an RRC establishment request message to an access layer of the terminal, where the request message carries an indication of not performing an ACB check, where the processor is configured to confirm, by the protocol-stack upper layer, that the service initiated by the terminal can pass the ACDC check, and determine that the obtained coverage identifier corresponding to the application identifier of the service passing the ACDC check is not overriding the ACB check; and the transmitter is configured to: after the processor determines that the override identifier is not overriding the ACB check, send, by the protocol-stack upper layer, an RRC establishment request message to the access layer of the terminal, so that the access layer establishes an RRC connection after confirming the ACB check.

With reference to the seventh aspect, in a first possible implementation manner of the seventh aspect, the receiver is further configured to receive, by the access layer, the ACDC check starting notification, a service list, and the override identifier that are sent by a wireless access network device; or receive, by the access layer, the ACDC check starting notification and the override identifier that are sent by a wireless access network device.

According to an eighth aspect, a terminal includes a transmitter, configured to send, by an access layer, an ACDC check starting notification, a receiver, configured to: after an initiated service passes an ACDC check, receive, by the access layer, an RRC establishment request, where the RRC establishment request carries an override identifier corresponding to an application identifier of the service passing the ACDC check, and a processor, configured to, after the access layer determines that the override identifier received by the receiver is overriding an ACB check, establish an RRC connection, or configured to, after the access layer determines that the override identifier received by the receiver is not overriding an ACB check, start the ACB check, and establish an RRC connection after the ACB check is passed.

In first possible implementation manner of the eighth aspect, the receiver is further configured to receive, by the access layer, the ACDC check starting notification, a service list, and the override identifier that are sent by a wireless access network device.

According to a ninth aspect, a terminal is provided, where the terminal includes: a receiver, configured to receive, by an access layer, an ACDC check starting notification, where the receiver is configured to receive, by the access layer, an RRC establishment request message, and a processing module, configured to: if the RRC establishment request message received by the receiver carries an indication of not performing an ACB check, establish, by the access layer of the terminal, an RRC connection, or configured to, if the RRC establishment request message received by the receiver carries an indication of performing an ACB check, perform, by the access layer of the terminal, an ACB check, and establish an RRC connection after the ACB check is passed.

According to a tenth aspect, an access control system is provided, including: a terminal, a core network device, and an access network device, where the terminal is the terminal according to any one of claims 10 to 13; or the terminal is the terminal according to claim 14 or 15; or the terminal is the terminal according to claim 16 or 17 or the terminal according to claim 18.

A protocol-stack upper layer of a terminal receives an override identifier sent by a core network device; and if the protocol-stack upper layer of the terminal confirms that a service initiated by the terminal can pass the ACDC check and determines that the override identifier corresponding to an application identifier of the service passing the ACDC check is overriding an access class barring ACB check, the protocol-stack upper layer of the terminal sends an RRC establishment request message to an access layer of the terminal, where the request message carries an indication of not performing an ACB check; therefore, the ACB check does not need to be performed. Therefore, in some special cases, even if the terminal cannot pass the ACB check, the terminal can still perform services of some particular applications (for example, a disaster information bulletin board service).

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
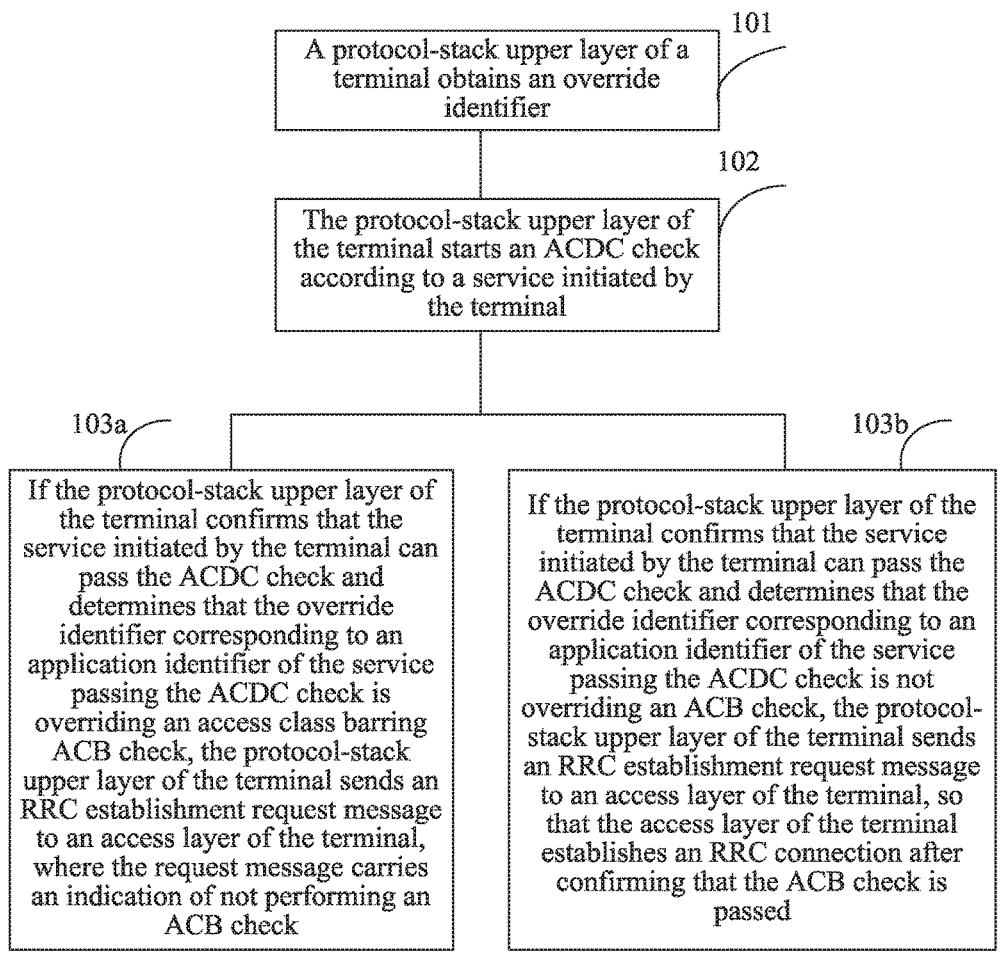
FIG. 1 is a flowchart of an access control method according to an embodiment of the present invention.

FIG. 1 is a flowchart of an access control method according to an embodiment of the present invention. This embodiment includes the following.

Step 101: A protocol-stack upper layer of a terminal obtains an override identifier.

The obtaining, by a protocol-stack upper layer of a terminal, an override identifier includes receiving, by the protocol-stack upper layer of the terminal, an override identifier sent by a core network device, or receiving, by the protocol-stack upper layer of the terminal, a service list sent by a core network device, where the service list carries an override identifier, or receiving, by the protocol-stack upper layer of the terminal, a service list sent by an access layer of the terminal, where the service list carries an override identifier; or receiving, by the protocol-stack upper layer of the terminal, an override identifier, which is sent by the wireless access network device by using an access layer of the terminal, or obtaining, by the protocol-stack upper layer of the terminal, a locally configured coverage identifier, or obtaining, by the protocol-stack upper layer of the terminal, a locally configured service list, where the service list carries an override identifier.

Step 102: The protocol-stack upper layer of the terminal starts an ACDC check according to a service initiated by the terminal.

Step 103*a*: If the protocol-stack upper layer of the terminal confirms that the service initiated by the terminal can pass the ACDC check and determines that the override identifier corresponding to an application identifier of the service passing the ACDC check is overriding an access class barring ACB check, the protocol-stack upper layer of the terminal sends an RRC establishment request message to an access layer of the terminal, where the request message carries an indication of not performing an ACB check.

Step 103*b*: If the protocol-stack upper layer of the terminal confirms that the service initiated by the terminal can pass the ACDC check and determines that the override identifier corresponding to an application identifier of the service passing the ACDC check is not overriding an ACB check, the protocol-stack upper layer of the terminal sends an RRC establishment request message to an access layer of the terminal, so that the access layer of the terminal establishes an RRC connection after confirming the ACB check.

A protocol-stack upper layer of a terminal receives an override identifier sent by a core network; and if the protocol-stack upper layer of the terminal confirms that a service initiated by the terminal can pass the ACDC check and determines that the override identifier corresponding to an application identifier of the service passing the ACDC check is overriding an access class barring ACB check, the protocol-stack upper layer of the terminal sends an RRC establishment request message to an access layer of the terminal, where the request message carries an indication of not performing an ACB check. Therefore, in some special cases, even if the terminal cannot pass the ACB check, the terminal can still perform services of some particular applications (for example, a disaster information bulletin board service).

Further, after the protocol-stack upper layer of the terminal confirms that the service initiated by the terminal can pass the ACDC check, the method further includes: determining, by the protocol-stack upper layer of the terminal according to the override identifier corresponding to the application identifier of the service passing the ACDC check, whether the ACB check needs to be performed.

Further, before the starting, by the protocol-stack upper layer of the terminal, the ACDC check according to a service initiated by the terminal, the method further includes: if the terminal is in an idle state, receiving, by the protocol-stack upper layer of the terminal, a system broadcast message sent by the access layer of the terminal, and notifying the protocol-stack upper layer of the terminal of starting the ACDC check, where the system broadcast message is sent by the wireless access network device after the wireless access network device learns that the wireless access network device and/or the core network device is congested, and starts the ACDC check; or if the terminal is in a connected state, receiving, by the protocol-stack upper layer of the terminal, dedicated signaling sent by the access layer of the terminal, and notifying the protocol-stack upper layer of the terminal of starting the ACDC check, where the dedicated signaling is sent by the wireless access network device after the wireless access network device learns that the wireless access network device and/or the core network device is congested, and starts the ACDC.

Figure 2:
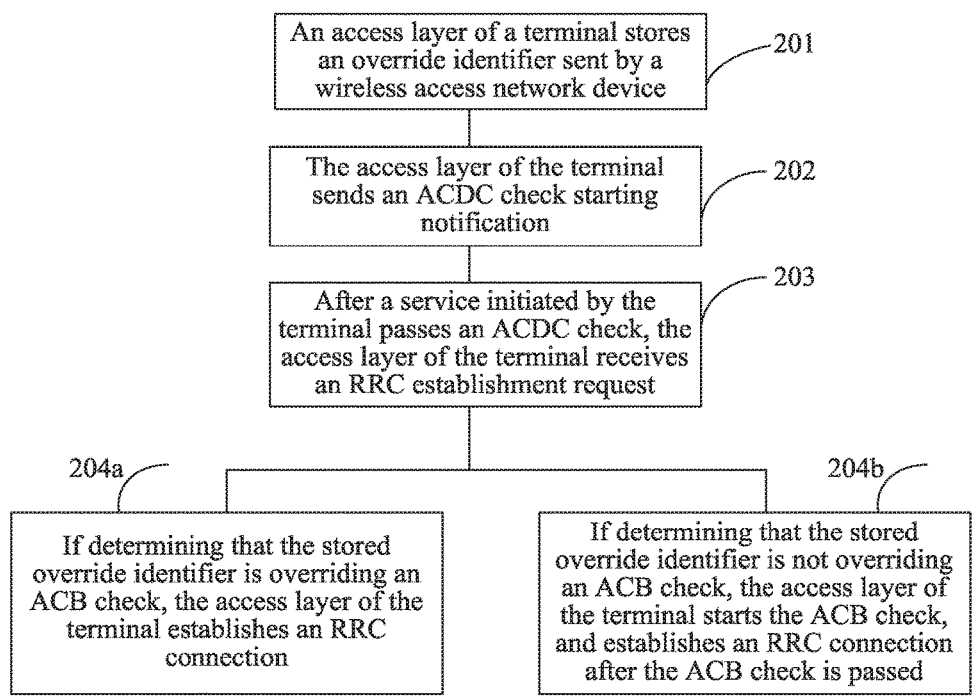
FIG. 2 is a flowchart of an access control method according to another embodiment.

FIG. 2 is a flowchart of an access control method according to another embodiment of the present invention. This embodiment includes the following.

Step 201: An access layer of a terminal stores an override identifier sent by a wireless access network device.

Step 202: The access layer of the terminal sends an ACDC check starting notification.

Step 203: After a service initiated by the terminal passes an ACDC check, the access layer of the terminal receives an RRC establishment request.

Step 204*a*: If determining that the stored coverage identifier is overriding an ACB check, the access layer of the terminal establishes an RRC connection.

Step 204*b*: If determining that the stored coverage identifier is not overriding an ACB check, the access layer of the terminal starts the ACB check, and establishes an RRC connection after the ACB check is passed.

In this embodiment, an access layer of a terminal receives and stores an override identifier; after a service initiated by the terminal passes an ACDC check, the access layer of the terminal receives an RRC establishment request; and if determining that the stored coverage identifier is overriding an ACB check, the access layer of the terminal establishes an RRC connection. Therefore, in some special cases, even if the terminal cannot pass the ACB check, the terminal can still perform services of some particular applications (for example, a disaster information bulletin board service).

Further, before the storing, by an access layer of a terminal, an override identifier sent by a wireless access network device, the method further includes: receiving, by the access layer of the terminal, the ACDC check starting notification, a service list, and the override identifier that are sent by the wireless access network device; or receiving, by the access layer of the terminal, the ACDC check starting notification and the override identifier that are sent by the wireless access network device.

Figure 3:
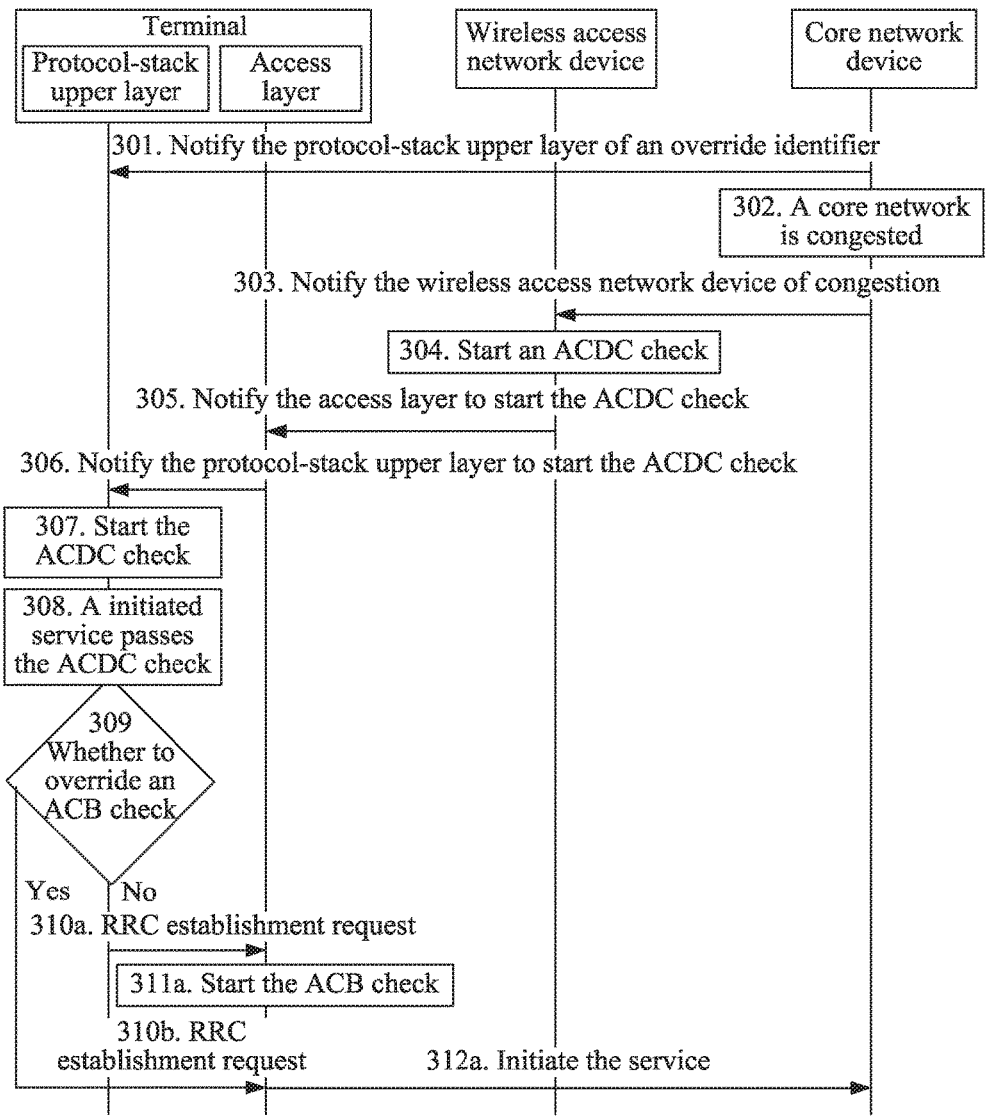
FIG. 3 is a flowchart of an access control method according to another embodiment.

FIG. 3 is a flowchart of an access control method according to an embodiment of the present invention. This embodiment includes:

301: A core network device sends an override identifier to a protocol-stack upper layer of a terminal.

For example, the core network device may send an Open Mobile Alliance Device Management (OMA DM) message or a non-access stratum (NAS) message to the protocol-stack upper layer of the terminal, where the OMA DM message or the NAS message carries the override identifier, where the NAS message includes but is not limited to an attach accept message or a location update accept message or the like.

The protocol-stack upper layer of the terminal includes an application layer and/or a NAS layer. This embodiment of the present invention is described by using the application layer and the NAS layer as examples, but the present invention is not limited thereto.

302: The core network device determines that the core network device is congested.

303: The core network device notifies a wireless access network device of a congestion status of the core network device.

304: After the wireless access network device learns that the core network device is congested, the wireless access network device starts an ACDC check.

305: The wireless access network device sends a system broadcast message, to notify the terminal to start the ACDC check.

306: After receiving the system broadcast message, an access layer of the terminal notifies the protocol-stack upper layer of the terminal of starting the ACDC check.

307: The protocol-stack upper layer of the terminal starts the ACDC check.

308: The protocol-stack upper layer of the terminal confirms, according to a service list, that a service initiated by the terminal can pass the ACDC check.

The protocol-stack upper layer of the terminal may determine, according to the service list, whether the service initiated by the terminal can pass the ACDC check in the following manner. When the terminal initiates the service, the protocol-stack upper layer of the terminal determines whether an application identifier of the initiated service is in the service list according to the service list. If the application identifier of the initiated service is in the service list, the service corresponding to the application identifier is allowed; if the application identifier of the initiated service is not in the service list, the service corresponding to the application identifier is prohibited.

The terminal may obtain the service list in the following manner. In step 301, the core network device sends the service list and the override identifier together to the protocol-stack upper layer of the terminal; or the service list is pre-configured on the terminal before delivery; or a network configures the service list on the terminal by using a NAS message or an OMA message. The foregoing obtaining manner is merely an example used in this embodiment of the present invention, and the present invention is not limited thereto.

309: If the initiated service passes the ACDC check, the protocol-stack upper layer of the terminal determines, according to the override identifier corresponding to an application identifier of the service passing the ACDC check, whether an ACB check needs to be performed.

The override identifier may be independent of the service list. The service list may be represented in a form of a blacklist or in a form of a whitelist, where the whitelist includes application identifiers corresponding to services that are allowed to pass the ACDC check, and the blacklist includes application identifiers corresponding to services that are prohibited from passing the ACDC check. As shown in Table 1, the service list is described by using the whitelist form as an example.

TABLE 1

| Service list | |
|---|---|
| Application identifier | Coverage identifier |
| APP1 | 1 |
| APP2 | |
| APP3 | |

The service list 1 may include three application identifiers APP1, APP2, and APP3, which indicates that after the ACDC check is started, only services corresponding to the three application identifiers are allowed to be initiated. For example, APP1 may be a disaster information bulletin board service, APP2 may be a QQ (instant messaging software) service, and APP3 may be an Internet service. The override identifier may be independent of the service list, and may have a value of 1 or 0. For example, when the override identifier is 0, it indicates that both the ACDC check and the ACB check need to be performed; when the override identifier is 1, it indicates that only the ACDC check needs to be performed. This embodiment of the present invention is described by using an example in which the value of the override identifier is 1, which indicates that only the ACDC check is performed on APP1 APP2, and APP3 and the ACB check does not need to be performed.

After it is determined in step 309 whether the ACB check needs to be performed, there are two cases depending on determining results: 310*a* to 311*a*, and 310*b*.

310*a*: If the override identifier corresponding to the application identifier of the service passing the ACDC check is not overriding the ACB check, the protocol-stack upper layer of the terminal requests the access layer of the terminal to perform RRC establishment, and step 311*a* is performed.

311*a*: The access layer of the terminal performs the ACB check according to broadcast information of a base station and an Access class of the terminal, and if the ACB check is passed, step 312*a* is performed.

312*a*: The access layer of the terminal establishes an RRC connection, and initiates the service.

310*b*: If the override identifier corresponding to the application identifier of the service passing the ACDC check is overriding the ACB check, the protocol-stack upper layer of the terminal requests the access layer of the terminal to perform RRC establishment, and adds an indication of not performing an ACB check to a request message, and step 312*a* is performed.

In this embodiment, a protocol-stack upper layer of a terminal receives an override identifier sent by a core network, and determines, according to a service list, whether a service initiated by the terminal can pass an ACDC check. If the initiated service passes the ACDC check and the override identifier corresponding to an application identifier of the service passing the ACDC check is overriding an ACB check, the ACB check does not need to be performed. Therefore, in some special cases, even if the terminal cannot pass the ACB check, the terminal can still perform services of some particular applications (for example, a disaster information bulletin board service).

Figure 4:
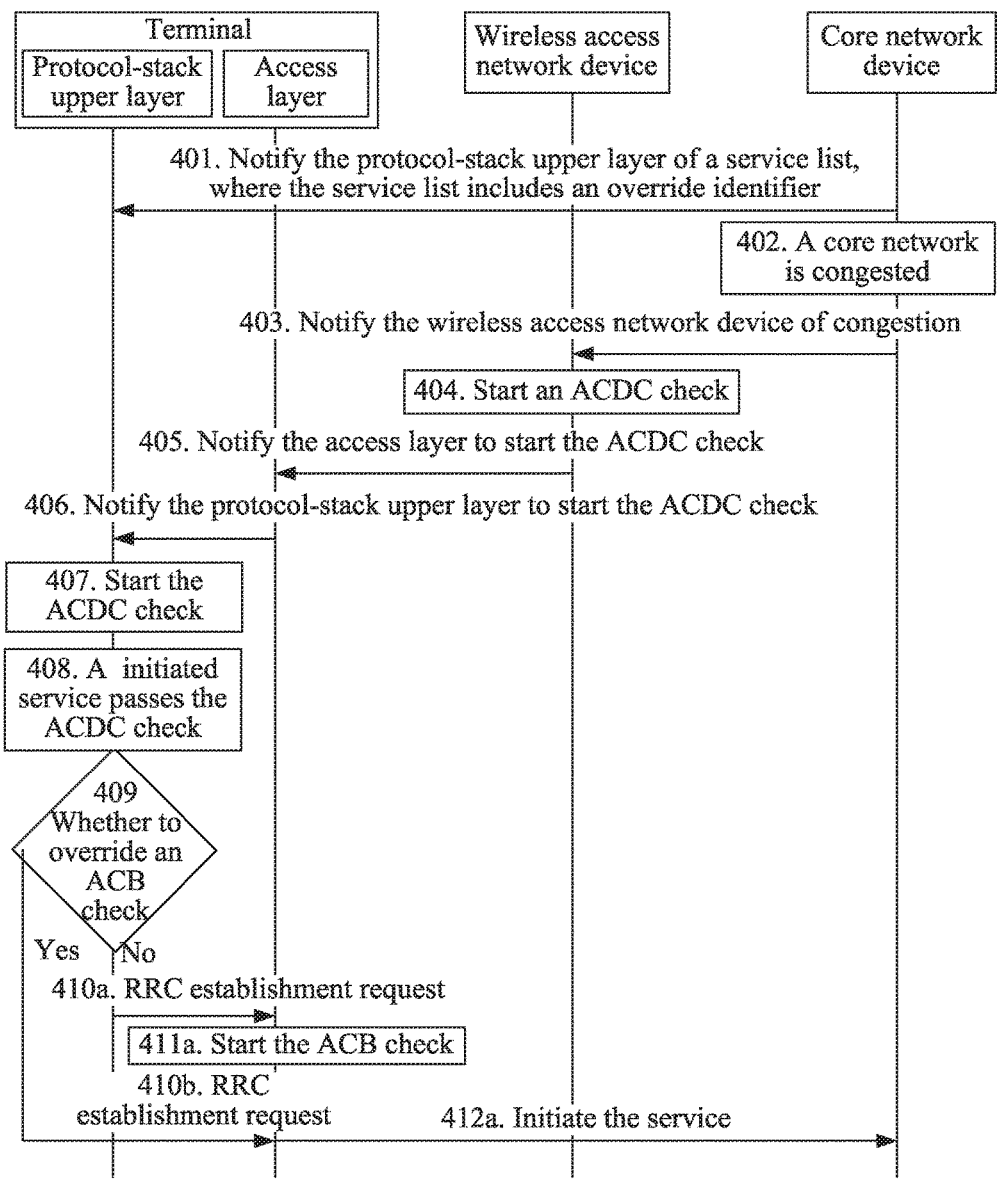
FIG. 4 is a flowchart of an access control method according to another embodiment.

FIG. 4 is a flowchart of an access control method according to another embodiment of the present invention. A service list in this embodiment includes an override identifier. This embodiment includes:

401: A core network device sends the service list to a protocol-stack upper layer of a terminal, where the service list includes the override identifier, and the override identifier is used to determine whether an ACDC check is overriding an ACB check.

For example, the core network device may send an OMA DM message or a NAS message to the protocol-stack upper layer of the terminal, where the OMA DM message or the NAS message carries the service list.

The protocol-stack upper layer includes an application layer and/or a NAS layer. This embodiment of the present invention is described by using the application layer and the NAS layer as examples, but the present invention is not limited thereto.

402: The core network device determines that the core network device is congested.

403: The core network device notifies a wireless access network device of a congestion status of the core network device.

404: After the wireless access network device learns that the core network device is congested, the wireless access network device starts the ACDC check.

405: The wireless access network device sends a system broadcast message, to notify the terminal to start the ACDC check.

406: After receiving the system broadcast message, an access layer of the terminal notifies the protocol-stack upper layer of the terminal of starting the ACDC check.

407: The protocol-stack upper layer of the terminal starts the ACDC check.

408: The protocol-stack upper layer of the terminal confirms, according to the service list, that a service initiated by the terminal can pass the ACDC check.

The protocol-stack upper layer of the terminal may determine, according to the service list, whether the service initiated by the terminal can pass the ACDC check in the following manner:

when the terminal initiates the service, the protocol-stack upper layer of the terminal determines whether an application identifier of the initiated service is in the service list. If the application identifier corresponding to the initiated service is in the service list, the service is allowed; if the application identifier corresponding to the initiated service is not in the service list, the service is prohibited.

409: If the initiated service passes the ACDC check, the protocol-stack upper layer of the terminal determines, according to the override identifier corresponding to an application identifier of the service passing the ACDC check, whether the ACB check needs to be performed.

The service list may be represented in a form of a blacklist or in a form of a whitelist, where the whitelist includes application identifiers of allowed services, and the blacklist includes application identifiers of prohibited services. Each application identifier corresponds to an identifier indicating whether the ACDC check is overriding the ACB check. As shown in Table 2, the service list is described by using the whitelist form as an example.

TABLE 2

| Service list | |
| --- | --- |
| Application identifier | Coverage identifier |
| APP1 | 1 |
| APP2 | 0 |
| APP3 | 0 |

The service list 1 may include application identifiers and coverage identifiers. The application identifiers may include APP1 APP2, and APP3, which indicates that after the ACDC check is started, only services corresponding to the three application identifiers are allowed to be initiated. For example, APP1 may be a disaster information bulletin board service, APP2 may be a QQ service, and APP3 may be an Internet service. The override identifiers may have a value of 1 or 0. When the value of an override identifier is 0, it indicates that both the ACDC check and the ACB check need to be performed; when the value of an override identifier is 1, it indicates that only the ACDC check needs to be performed, and the ACB check does not need to be performed. Therefore, in the case of network congestion, even if the terminal cannot pass the ACB check, the terminal can still perform the disaster information bulletin board service, thereby ensuring safety of a user.

After it is determined in step 409 whether the ACB check needs to be performed, there are two cases depending on determining results: 410*a* to 411*a*, and 410*b*.

410*a*: If the override identifier corresponding to the application identifier of the service passing the ACDC check is not overriding the ACB check, the protocol-stack upper layer of the terminal requests the access layer of the terminal to perform RRC establishment, and step 411*a* is performed.

411*a*: The access layer of the terminal performs the ACB check according to broadcast information of a base station and an Access class of the terminal, and if the ACB check is passed, step 412*a* is performed.

412*a*: The access layer of the terminal establishes an RRC connection, and initiates the service.

410*b*: If the override identifier corresponding to the application identifier of the service passing the ACDC check is overriding the ACB check, the protocol-stack upper layer of the terminal sends an RRC establishment request to the access layer of the terminal, and adds an indication of not performing an ACB check to a request message, and step 412*a* is performed.

In this embodiment, a terminal receives a service list sent by a core network device, where the service list includes an override identifier; and a protocol-stack upper layer of the terminal determines, according to the service list, whether a service initiated by the terminal can pass an ACDC check. If the initiated service passes the ACDC check and the override identifier corresponding to an application identifier of the service passing the ACDC check is overriding an ACB check, the ACB check does not need to be performed. Therefore, in some special cases, even if the terminal cannot pass the ACB check, the terminal can still perform services of some particular applications (for example, a disaster information bulletin board service).

Figure 5:
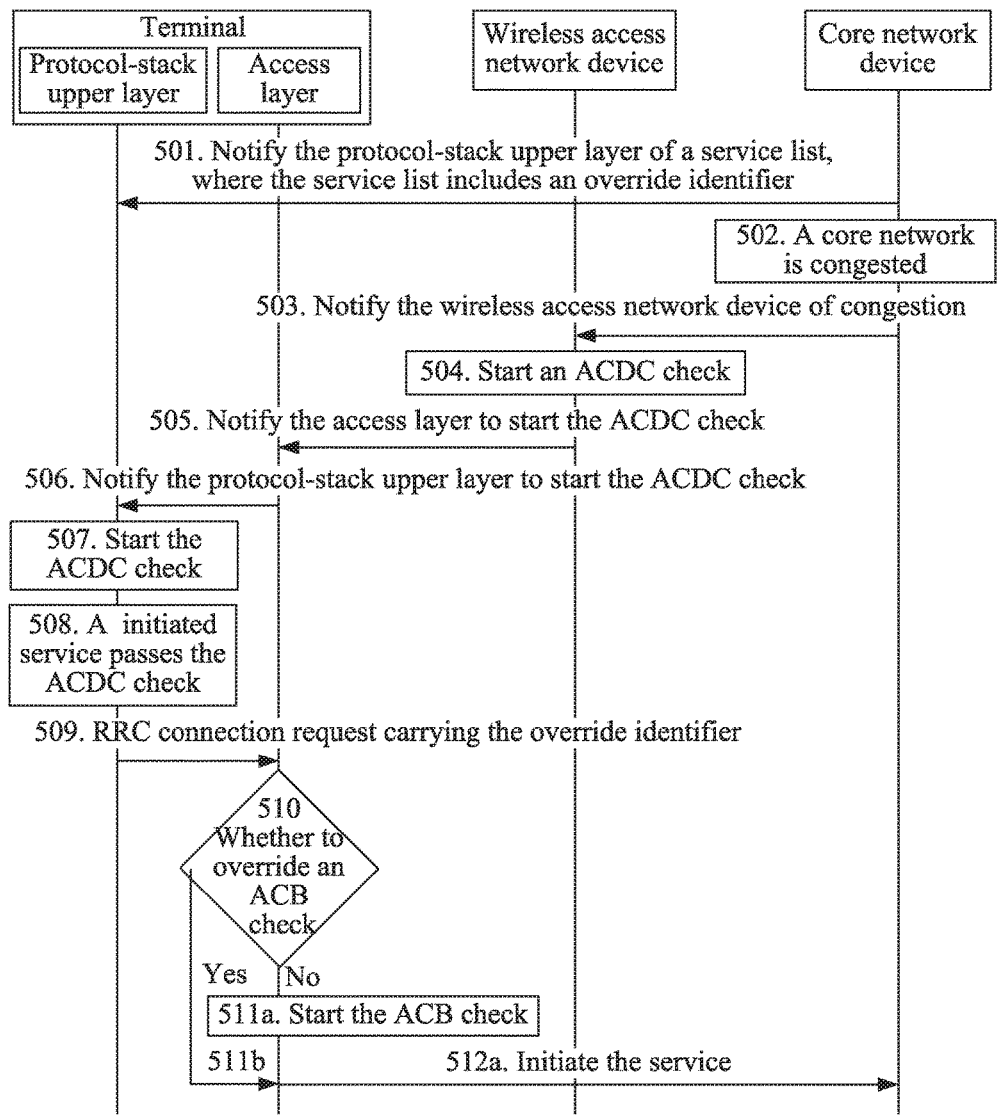
FIG. 5 is a flowchart of an access control method according to another embodiment.

FIG. 5 is a flowchart of an access control method according to another embodiment of the present invention. In this embodiment, if a service initiated by a terminal can pass an ACDC check, a protocol-stack upper layer of the terminal sends an override identifier to an access layer of the terminal, and the access layer of the terminal determines whether to perform an ACB check. This embodiment includes:

Steps 501 to 508 are similar to steps 401 to 408 in the embodiment shown in FIG. 4 and are not described in detail herein.

509: If the initiated service passes the ACDC check, the protocol-stack upper layer of the terminal sends an RRC connection establishment request to the access layer of the terminal, where the RRC connection establishment request carries the override identifier corresponding to an application identifier of the service passing the ACDC check.

510: The access layer of the terminal determines, according to the received coverage identifier, whether an ACB check needs to be performed.

After it is determined in step 510 whether the ACB check needs to be performed, there are two cases depending on determining results: 511*a* to 512*a*, and 511*b*.

511*a*: If the override identifier received by the access layer of the terminal is not overriding the ACB check, the access layer of the terminal normally performs the ACB check according to broadcast information of a base station and an Access class of the terminal, and if the ACB check is passed, 512*a* is performed.

512*a*: The access layer of the terminal establishes an RRC connection, and initiates the service.

511*b*: If the override identifier received by the access layer of the terminal is overriding the ACB check, the access layer of the terminal does not need to perform the ACB check, and the access layer of the terminal performs step 512*a*.

In this embodiment, a terminal receives a service list sent by a core network, where the service list includes an override identifier, if determining that an initiated service passes an ACDC check, a protocol-stack upper layer of the terminal sends the override identifier corresponding to an application identifier of the service passing the ACDC check to an access layer of the terminal, and if the override identifier is an identifier overriding an ACB check, the ACB check does not need to be performed. Therefore, in some special cases, even if the terminal cannot pass the ACB check, the terminal can still perform services of some particular applications (for example, a disaster information bulletin board service).

Figure 6:
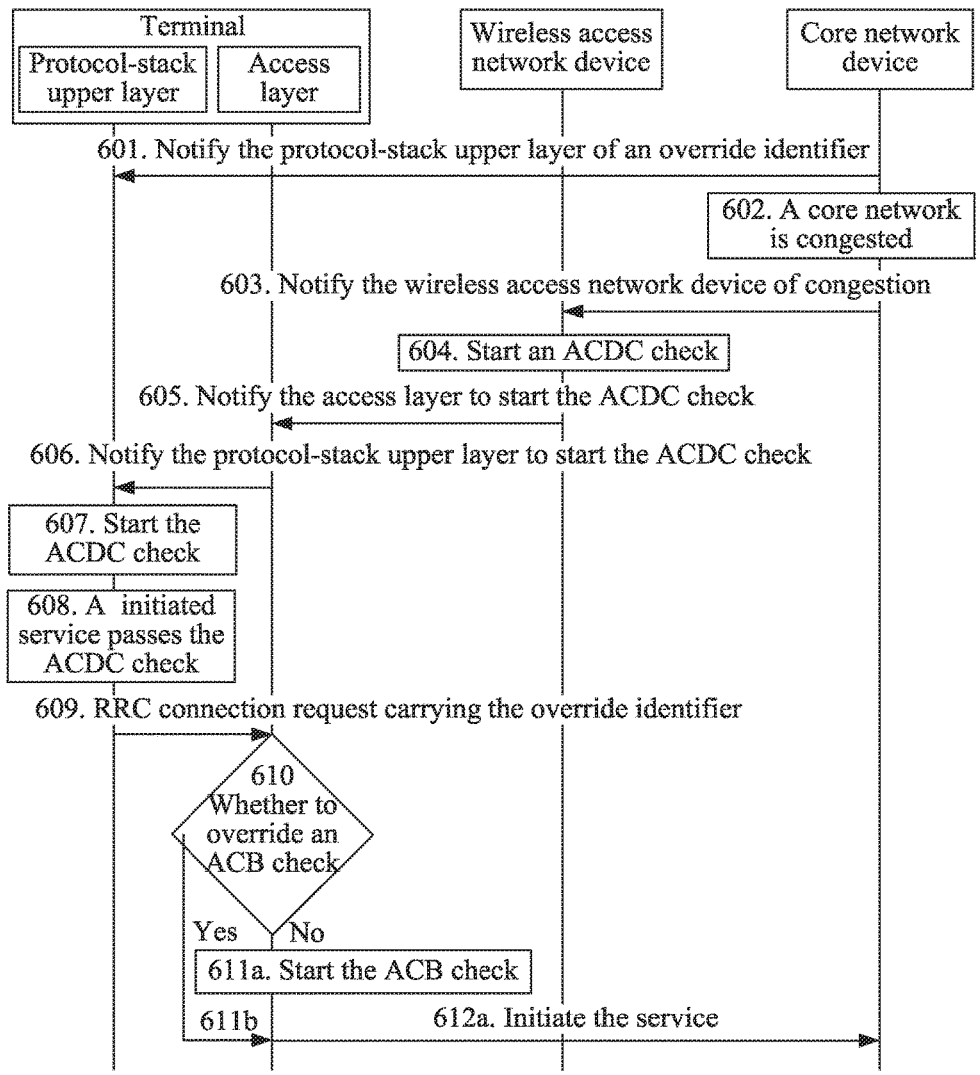
FIG. 6 is a flowchart of an access control method according to another embodiment.

FIG. 6 is a flowchart of an access control method according to another embodiment of the present invention. This embodiment is similar to the embodiment shown in FIG. 5. This embodiment includes:

Step 601: A core network device sends an override identifier to a protocol-stack upper layer of a terminal.

Steps 602 to 607 are similar to steps 502 to 507 in the embodiment in FIG. 5 and are not described in detail herein.

Step 608: The protocol-stack upper layer of the terminal confirms, according to the service list, that a service initiated by the terminal can pass the ACDC check.

The protocol-stack upper layer of the terminal may determine, according to the service list, whether the service initiated by the terminal can pass the ACDC check in the following manner. When the terminal initiates the service, the protocol-stack upper layer of the terminal determines whether an application identifier of the initiated service is in the service list according to the service list. If the application identifier of the initiated service is in the service list, the service corresponding to the application identifier is allowed; if the application identifier of the initiated service is not in the service list, the service corresponding to the application identifier is prohibited.

A method used by the terminal to obtain the service list may include the following. In step 601, the core network device sends the service list and the override identifier together to the protocol-stack upper layer of the terminal; or the service list is pre-configured in the terminal before delivery, or a network configures the service list in the terminal by using a NAS message or an OMA message. The foregoing obtaining manner is merely an example used in this embodiment of the present invention, and the present invention is not limited thereto.

Steps 609 to 612*a* are similar to steps 509 to 512*a* in Embodiment 5 and are not described in detail herein.

In this embodiment, a protocol-stack upper layer of a terminal receives an override identifier sent by a core network device, if determining that an initiated service passes an ACDC check, the protocol-stack upper layer of the terminal sends the override identifier corresponding to an application identifier of the service passing the ACDC check to an access layer of the terminal; and if the override identifier is an identifier overriding an ACB check, the ACB check does not need to be performed. Therefore, in some special cases, even if the terminal cannot pass the ACB check, the terminal can still perform services of some particular applications (for example, a disaster information bulletin board service).

Figure 7:
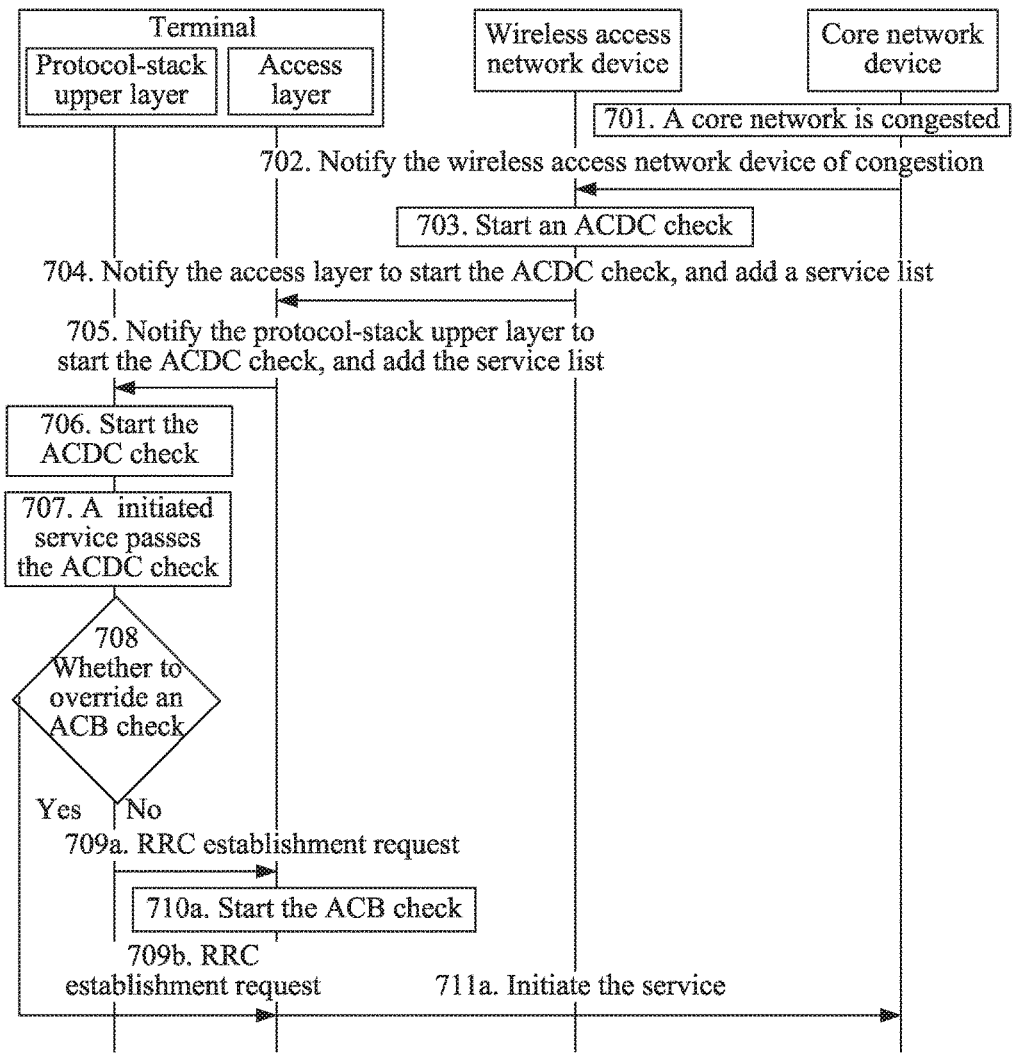
FIG. 7 is a flowchart of an access control method according to another embodiment.

FIG. 7 is a flowchart of an access control method according to another embodiment of the present invention. A wireless access network device in this embodiment sends a system broadcast message including an indication indicating whether an ACDC check overrides an ACB check to an access layer of a terminal. This embodiment includes:

701: A core network device determines that the core network device is congested.

702: The core network device notifies a wireless access network device of a congestion status of the core network device.

703: After the wireless access network device learns that the core network device is congested, the wireless access network device starts an ACDC check.

704: The wireless access network device sends a system broadcast message to an access layer of a terminal, to notify the terminal to start the ACDC check, where the broadcast message carries a service list, and the service list includes an override identifier.

705: After the access layer of the terminal receives the system broadcast message, the access layer of the terminal sends an ACDC check starting notification to a protocol-stack upper layer of the terminal, where the notification carries the service list, and the service list includes the override identifier.

706: The protocol-stack upper layer of the terminal starts the ACDC check.

707: The protocol-stack upper layer of the terminal determines, according to the service list, whether a service initiated by the terminal can pass the ACDC check, and if the initiated service passes the ACDC check, step 708 is performed.

When the terminal initiates the service, the protocol-stack upper layer of the terminal determines whether an application identifier of the initiated service is in the service list. If the application identifier corresponding to the initiated service is in the service list, the service is allowed; if the application identifier corresponding to the initiated service is not in the service list, the service is prohibited.

708: The protocol-stack upper layer of the terminal determines, according to the override identifier corresponding to the application identifier of the service passing the ACDC check, whether the ACB check needs to be performed.

After it is determined in step 708 whether the ACB check needs to be performed, there are two cases depending on determining results: 709a to 710a, and 709b.

709a: If the override identifier corresponding to the application identifier of the service passing the ACDC check is not overriding the ACB check, the protocol-stack upper layer of the terminal requests the access layer of the terminal to perform RRC establishment, and step 710a is performed.

710a: The access layer of the terminal performs the ACB check according to broadcast information of a base station and an Access class of the terminal, and if the ACB check is passed, step 711a is performed.

711a: The access layer of the terminal establishes an RRC connection, and initiates the service.

709b: If the override identifier corresponding to the application identifier of the service passing the ACDC check is overriding the ACB check, the protocol-stack upper layer of the terminal requests the access layer of the terminal to perform RRC establishment, and adds an indication of not performing an ACB check to a request message, and step 711a is performed.

In this embodiment, a protocol-stack upper layer of a terminal receives a service list sent by an access layer of the terminal, where the service list includes an override identifier; and if the protocol-stack upper layer of the terminal determines that an initiated service passes an ACDC check and the override identifier corresponding to an application identifier of the service passing the ACDC check is overriding an ACB check, the ACB check does not need to be performed. Therefore, in some special cases, even if the terminal cannot pass the ACB check, the terminal can still perform services of some particular applications (for example, a disaster information bulletin board service).

Figure 8:
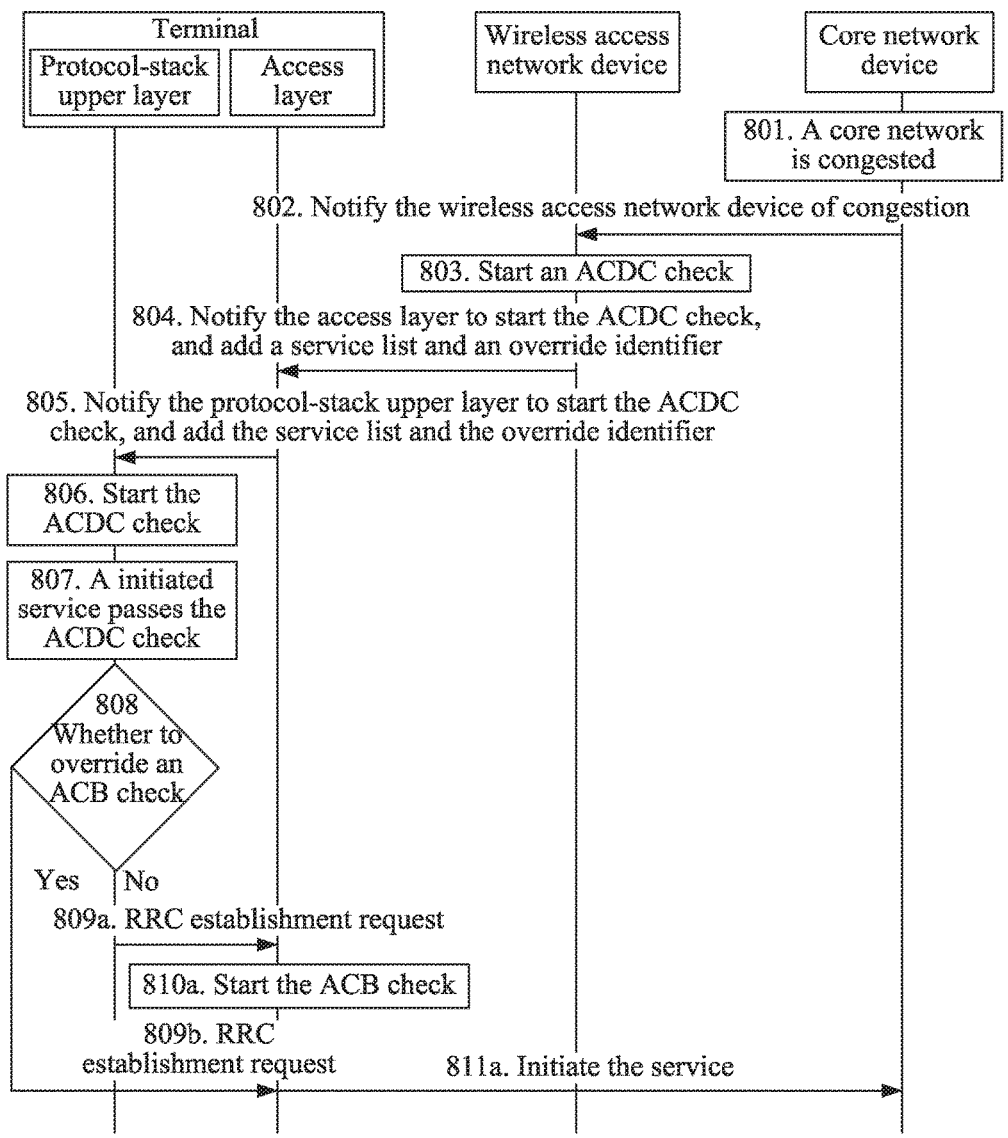
FIG. 8 is a flowchart of an access control method according to another embodiment.

FIG. 8 is a flowchart of an access control method according to another embodiment of the present invention. The access control method is similar to the embodiment shown in FIG. 7, and a difference lies in steps 804 and 805, that is, an override identifier is independent of a service list. This embodiment includes the following.

804: The wireless access network device sends a system broadcast message to an access layer of a terminal, to notify the terminal to start the ACDC check, where the broadcast message carries a service list and an override identifier.

805: After the access layer of the terminal receives the system broadcast message, the access layer of the terminal sends an ACDC check starting notification to a protocol-stack upper layer of the terminal, where the notification carries the service list and the override identifier.

In this embodiment, a protocol-stack upper layer of a terminal receives a service list and an override identifier that are sent by an access layer of the terminal; and if the protocol-stack upper layer of the terminal determines that an initiated service passes an ACDC check and the override identifier corresponding to an application identifier of the service passing the ACDC check is overriding an ACB check, the ACB check does not need to be performed. Therefore, in some special cases, even if the terminal cannot pass the ACB check, the terminal can still perform services of some particular applications (for example, a disaster information bulletin board service).

Figure 9:
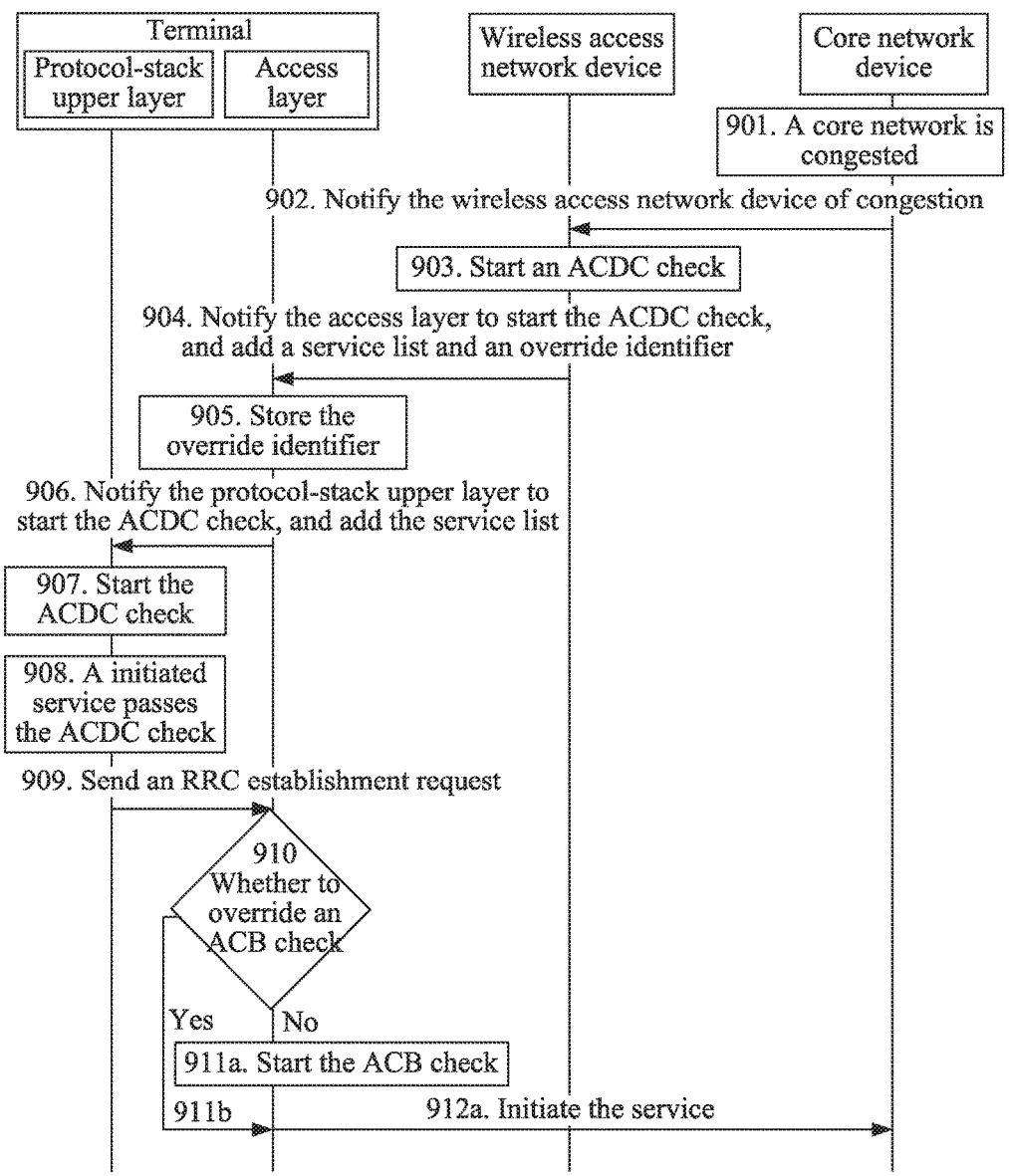
FIG. 9 is a flowchart of an access control method according to another embodiment.

FIG. 9 is a flowchart of an access control method according to another embodiment of the present invention. This embodiment includes the following.

901: A core network device determines that the core network device is congested.

902: The core network device notifies a wireless access network device of a congestion status of the core network device.

903: After the wireless access network device learns that the core network device is congested, the wireless access network device starts an ACDC check.

904: The wireless access network device sends a system broadcast message to an access layer of a terminal, to notify the terminal to start the ACDC check, where the broadcast message carries a service list and an override identifier.

905: The access layer of the terminal stores the override identifier.

906: After the access layer of the terminal receives the system broadcast message, the access layer of the terminal sends an ACDC check starting notification to a protocol-stack upper layer of the terminal, where the notification carries the service list.

907: The protocol-stack upper layer of the terminal starts the ACDC check.

908: The protocol-stack upper layer of the terminal confirms, according to the service list, that a service initiated by the terminal can pass the ACDC check.

The protocol-stack upper layer of the terminal may determine, according to the service list, whether the service initiated by the terminal can pass the ACDC check in the following manner. When the terminal initiates the service, the protocol-stack upper layer of the terminal determines whether an application identifier of the initiated service is in the service list. If the application identifier corresponding to the initiated service is in the service list, the service is allowed; if the application identifier corresponding to the initiated service is not in the service list, the service is prohibited.

909: The protocol-stack upper layer of the terminal sends an RRC connection establishment request to the access layer of the terminal.

910: The access layer of the terminal confirms, according to the override identifier stored in step 905, whether the override identifier is overriding an ACB check.

A confirmation manner in this embodiment is different from that in the foregoing embodiment. In this embodiment, the access layer of the terminal only needs to receive an RRC establishment request, which triggers the access layer of the terminal to confirm whether the stored coverage identifier is overriding the ACB check.

After it is determined in step 910 whether the ACB check needs to be performed, there are two cases depending on determining results: 911*a* to 912*a*, and 911*b*.

911*a*: If the override identifier received by the access layer of the terminal is not overriding the ACB check, the access layer of the terminal normally performs the ACB check according to broadcast information of a base station and an Access class of the terminal, and if the ACB check is passed, step 912*a* is performed.

912*a*: The access layer of the terminal establishes an RRC connection, and initiates the service.

911*b*: If the override identifier received by the access layer of the terminal is overriding the ACB check, the access layer of the terminal does not need to perform the ACB check, and the access layer of the terminal directly performs step 912*a*.

In this embodiment, an access layer of a terminal stores an override identifier sent by a wireless access network device; if determining that an initiated service passes an ACDC check, a protocol-stack upper layer of the terminal sends an RRC establishment request to the access layer of the terminal, so as to trigger the access layer of the terminal to confirm, according to the stored coverage identifier, whether the override identifier is overriding an ACB check; and if the override identifier is overriding the ACB check, the ACB check does not need to be performed. Therefore, in some special cases, even if the terminal cannot pass the ACB check, the terminal can still perform services of some particular applications (for example, a disaster information bulletin board service).

Figure 10:
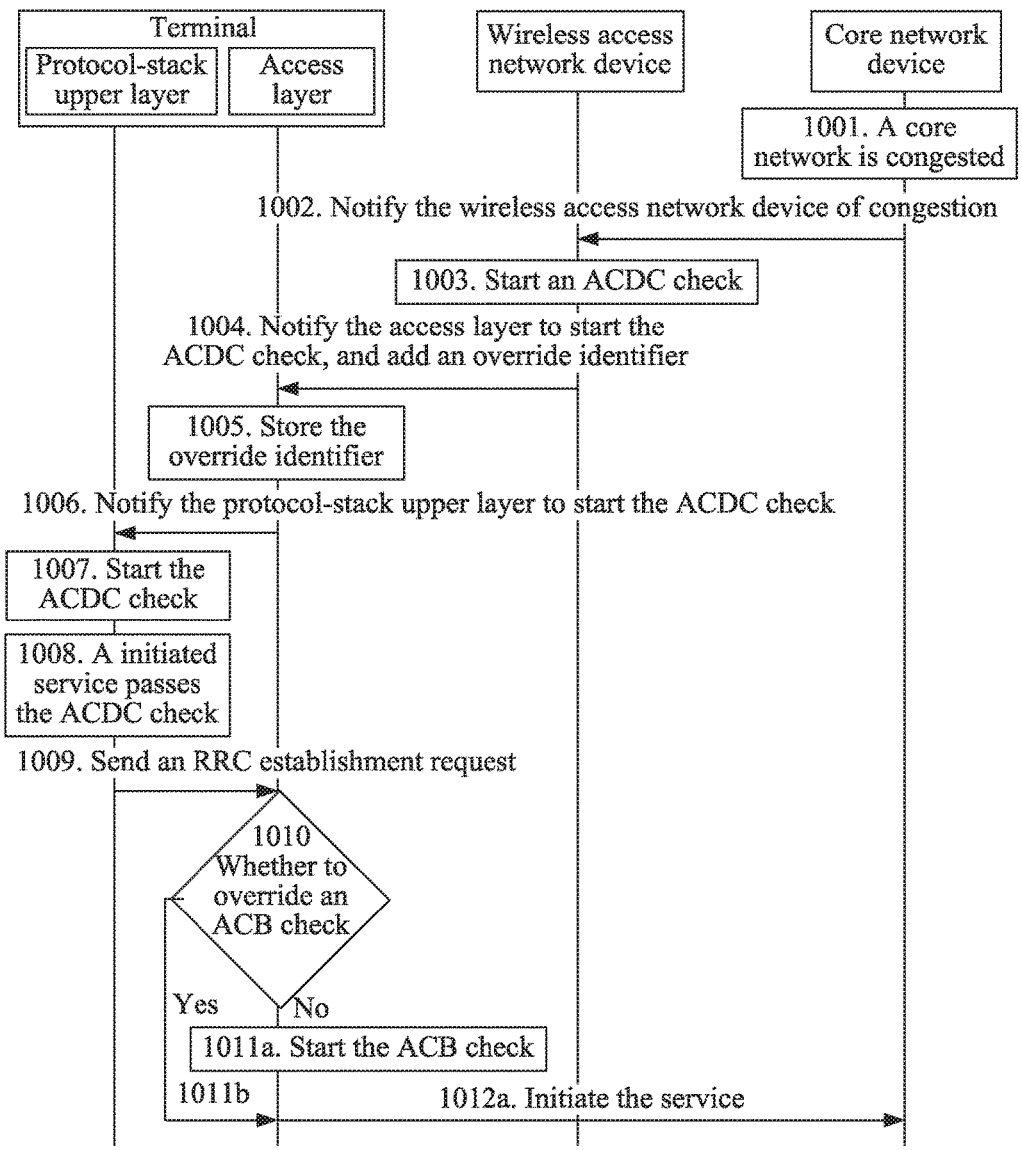
FIG. 10 is a flowchart of an access control method according to another embodiment.

FIG. 10 is a flowchart of an access control method according to another embodiment of the present invention. This embodiment is similar to the embodiment shown in FIG. 9. This embodiment includes the following.

Steps 1001 to 1003 are similar to steps 901 to 903 in the embodiment in FIG. 9 and are not described in detail herein.

Step 1004: The wireless access network device sends a system broadcast message to an access layer of a terminal, to notify the terminal to start the ACDC check, where the broadcast message carries an override identifier.

Step 1005: The access layer of the terminal stores the override identifier.

Step 1006: After receiving the system broadcast message, the access layer of the terminal sends an ACDC check starting notification to a protocol-stack upper layer of the terminal.

Step 1007: The protocol-stack upper layer of the terminal starts the ACDC check.

Step 1008: The protocol-stack upper layer of the terminal confirms, according to the service list, that a service initiated by the terminal can pass the ACDC check.

The protocol-stack upper layer of the terminal may determine, according to the service list, whether the service initiated by the terminal can pass the ACDC check in the following manner:

when the terminal initiates the service, the protocol-stack upper layer of the terminal determines whether an application identifier of the initiated service is in the service list according to the service list. If the application identifier of the initiated service is in the service list, the service corresponding to the application identifier is allowed; if the application identifier of the initiated service is not in the service list, the service corresponding to the application identifier is prohibited.

A method used by the terminal to obtain the service list may include the following. In step 1001, the wireless access network device sends the service list and the override identifier together to the protocol-stack upper layer of the terminal by using the access layer of the terminal; or the service list is pre-configured in the terminal before delivery; or a network configures the service list in the terminal by using a NAS message or an OMA message.

Steps 1009 to 1012*a* are similar to steps 909 to 912*a* in Embodiment 9 and are not described in detail herein.

In this embodiment, an access layer of a terminal stores an override identifier sent by a wireless access network device; if determining that an initiated service passes an ACDC check, a protocol-stack upper layer of the terminal sends an RRC establishment request to the access layer of the terminal, so as to trigger the access layer of the terminal to confirm, according to the stored coverage identifier, whether the override identifier is overriding an ACB check; and if the override identifier is overriding the ACB check, the ACB check does not need to be performed. Therefore, in some special cases, even if the terminal cannot pass the ACB check, the terminal can still perform services of some particular applications (for example, a disaster information bulletin board service).

Figure 11:
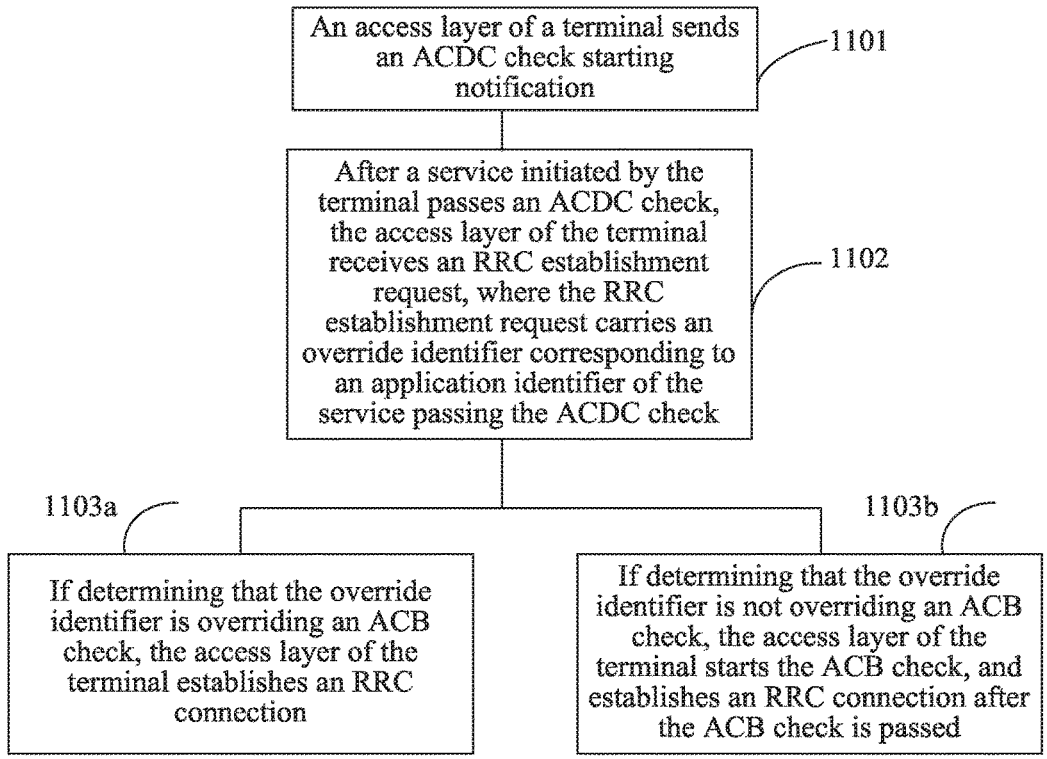
FIG. 11 is a schematic structural diagram of an embodiment of a terminal.

FIG. 11 is a flowchart of an access control method according to another embodiment of the present invention. This embodiment includes the following.

Step 1101: An access layer of a terminal sends an ACDC check starting notification.

Step 1102: After a service initiated by the terminal passes an ACDC check, the access layer of the terminal receives an RRC establishment request, where the RRC establishment request carries an override identifier corresponding to an application identifier of the service passing the ACDC check.

Step 1103*a*: If determining that the override identifier is overriding an ACB check, the access layer of the terminal establishes an RRC connection.

Step 1103*b*: If determining that the override identifier is not overriding an ACB check, the access layer of the terminal starts the ACB check, and establishes an RRC connection after the ACB check is passed.

In this embodiment, after a service initiated by a terminal passes an ACDC check, an access layer of the terminal receives an RRC establishment request, where the RRC establishment request carries an override identifier corresponding to an application identifier of the service passing the ACDC check; and if determining that the override identifier is overriding an ACB check, the access layer of the terminal establishes an RRC connection. Therefore, in some special cases, even if the terminal cannot pass the ACB check, the terminal can still perform services of some particular applications (for example, a disaster information bulletin board service).

Further, before the sending, by an access layer of a terminal, an ACDC check starting notification, the method further includes receiving, by the access layer of the terminal, the ACDC check starting notification, a service list, and the override identifier that are sent by a wireless access network device, or receiving, by the access layer of the terminal, the ACDC check starting notification and the override identifier that are sent by a wireless access network device.

Figure 12:
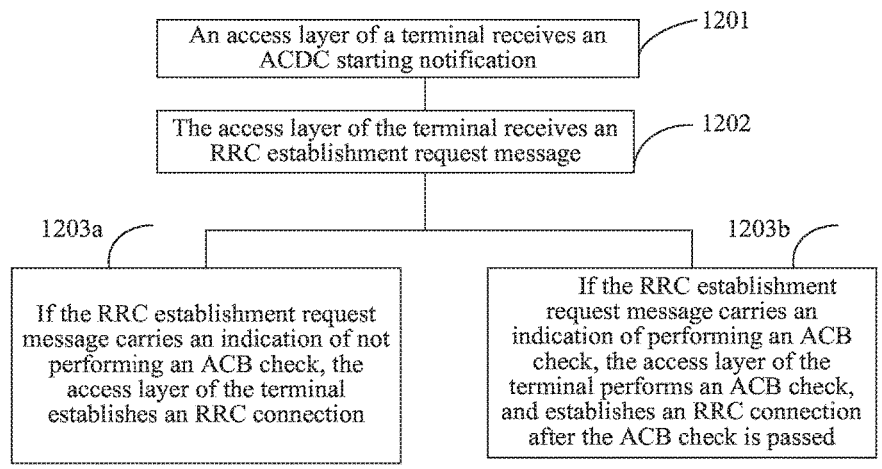
FIG. 12 is a schematic structural diagram of another embodiment of a terminal.

FIG. 12 is a flowchart of an access control method according to another embodiment of the present invention. This embodiment includes the following.

Step 1201: An access layer of a terminal receives an ACDC check starting notification.

Step 1202: The access layer of the terminal receives an RRC establishment request message.

Step 1203a: If the RRC establishment request message carries an indication of not performing an ACB check, the access layer of the terminal establishes an RRC connection.

Step 1203b: If the RRC establishment request message carries an indication of performing an ACB check, the access layer of the terminal performs an ACB check, and establishes an RRC connection after the ACB check is passed.

In this embodiment, the access layer of the terminal receives an RRC establishment request message; and if the RRC establishment request message carries an indication of not performing an ACB check, the access layer of the terminal establishes an RRC connection. Therefore, in some special cases, even if the terminal cannot pass the ACB check, the terminal can still perform services of some particular applications (for example, a disaster information bulletin board service).

An access control method provided by another embodiment of the present invention is similar to the foregoing embodiment. A difference lies in that in the foregoing embodiment, the terminal obtains the override identifier from a network side; while in this embodiment, the protocol-stack upper layer of the terminal may obtain a locally configured coverage identifier, where the locally configured coverage identifier may be an override identifier preset before delivery of the terminal.

An access control method provided by another embodiment of the present invention is similar to the foregoing embodiment. A difference lies in that in the foregoing embodiment, the wireless access network device notifies, by using a system broadcast message, the terminal to start the ACDC check; while in this embodiment, for a terminal in a connected state, the wireless access network device may also send an ACDC check starting notification by using dedicated signaling.

An access control method provided by another embodiment of the present invention is similar to the foregoing embodiment. A difference lies in that in the foregoing embodiment, after determining that the core network device is congested, the core network device notifies the wireless access network device of a congestion status of the core network device, and the wireless access network device starts the ACDC check; while in this embodiment, one case is that the ACDC check may be started when the wireless access network device is congested, and another case is that the wireless access network device starts the ACDC check when both the core network device and the wireless access network device are congested.

Figure 13:
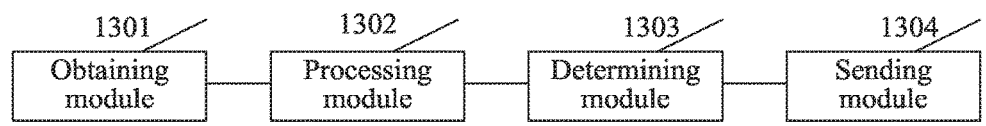
FIG. 13 is a schematic structural diagram of another embodiment of a terminal.

FIG. 13 is a schematic structural diagram of an embodiment of a terminal according to the present invention. The terminal includes an obtaining module 1301, configured to obtain, by a protocol-stack upper layer, an override identifier, a processing module 1302, configured to start, by the protocol-stack upper layer, an application specific congestion control for data connectivity ACDC check according to a service initiated by the terminal, a determining module 1303, configured to confirm, by the protocol-stack upper layer, that the service initiated by the terminal can pass the ACDC check, and determine that the override identifier that corresponds to an application identifier of the service passing the ACDC check and is obtained by the obtaining module is overriding an access class barring ACB check, and a sending module 1304, configured to: after the determining module 1303 determines that the override identifier is overriding the access class barring ACB check, send, by the protocol-stack upper layer, an RRC establishment request message to an access layer of the terminal, where the request message carries an indication of not performing an ACB check, where the determining module 1303 is configured to confirm, by the protocol-stack upper layer, that the service initiated by the terminal can pass the ACDC check, and determine that the override identifier that corresponds to the application identifier of the service passing the ACDC check and is obtained by the obtaining module is not overriding the ACB check, and the sending module 1304 is configured to: after the determining module 1303 determines that the override identifier is not overriding the ACB check, send, by the protocol-stack upper layer, an RRC establishment request message to the access layer of the terminal, so that the access layer establishes an RRC connection after confirming the ACB check.

The obtaining module may be specifically configured to: receive, by the protocol-stack upper layer, an override identifier sent by a core network device; or receive, by the protocol-stack upper layer, a service list sent by a core network device, where the service list carries an override identifier; or receive, by the protocol-stack upper layer, a service list sent by the access layer of the terminal, where the service list carries an override identifier; or receive, by the protocol-stack upper layer, an override identifier, which is sent by the wireless access network device by using the access layer of the terminal; or obtain, by the protocol-stack upper layer, a locally configured coverage identifier; or obtain, by the protocol-stack upper layer, a locally configured service list, where the service list carries an override identifier.

Optionally, the terminal may further include a judging module 1305, configured to determine, by the protocol-stack upper layer according to the override identifier that corresponds to the application identifier of the service passing the ACDC check and is obtained by the obtaining module, whether the ACB check needs to be performed.

Optionally, the terminal may further include a receiving module 1306, configured to receive, by the protocol-stack upper layer, a system broadcast message sent by the access layer of the terminal, and notify the protocol-stack upper layer of the terminal of starting the ACDC check, where the system broadcast message is sent by the wireless access network device after the wireless access network device learns that the wireless access network device and/or the core network device is congested, and starts the ACDC check; or configured to receive, by the protocol-stack upper layer, dedicated signaling sent by the access layer of the terminal, and notify the protocol-stack upper layer of the terminal of starting the ACDC check, where the dedicated signaling is sent by the wireless access network device after the wireless access network device learns that the wireless access network device and/or the core network device is congested, and starts the ACDC.

The protocol-stack upper layer of the terminal receives an override identifier sent by a core network; and if the protocol-stack upper layer of the terminal confirms that a service initiated by the terminal can pass the ACDC check and determines that the override identifier corresponding to an application identifier of the service passing the ACDC check is overriding an access class barring ACB check, the protocol-stack upper layer of the terminal sends an RRC establishment request message to the access layer of the terminal, where the request message carries an indication of not performing an ACB check; therefore, the ACB check does not need to be performed. Therefore, in some special cases, even if the terminal cannot pass the ACB check, the terminal can still perform services of some particular applications (for example, a disaster information bulletin board service).

During hardware implementation, the foregoing modules may be built in or independent of a processor of a base station in a form of hardware, or may be stored in a terminal in a form of software, for example, in a memory of UE, so as to be invoked by a processor to execute operations corresponding to the foregoing modules. The processor may be a central processing unit (CPU), a microprocessor, a single-chip microcomputer, or the like. The terminal shown in FIG. 13 can execute corresponding steps in the foregoing embodiment. For details, reference may be made to the description of the foregoing embodiment. For an achieved effect, reference may also be made to the description of the foregoing embodiment.

Figure 14:
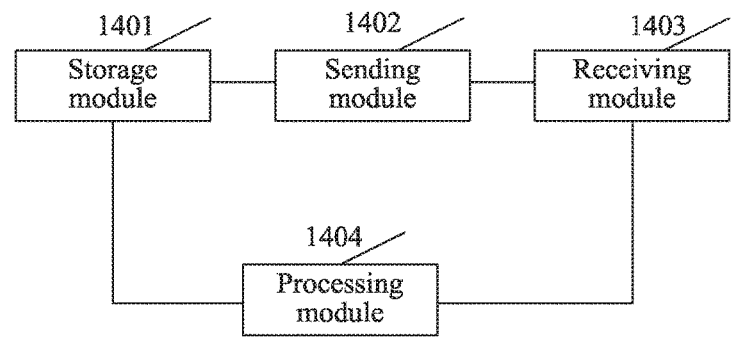
FIG. 14 is a schematic structural diagram of another embodiment of a terminal.

FIG. 14 is a schematic structural diagram of another embodiment of a terminal according to the present invention. The terminal includes a storage module 1401, configured to store, by an access layer, an override identifier sent by a wireless access network device, a sending module 1402, configured to send, by the access layer, an ACDC check starting notification, a receiving module 1403, configured to: after a service initiated by the terminal passes an ACDC check, receive, by the access layer, an RRC establishment request, and a processing module 1404, configured to: after the access layer determines that the override identifier stored by the storage module is overriding an ACB check, establish an RRC connection; or configured to: after the access layer determines that the override identifier stored by the storage module is not overriding an ACB check, start the ACB check, and establish an RRC connection after the ACB check is passed.

Optionally, the receiving module is further configured to receive, by the access layer, the ACDC check starting notification, a service list, and the override identifier that are sent by the wireless access network device; or receive, by the access layer, the ACDC check starting notification and the override identifier that are sent by the wireless access network device.

During hardware implementation, the foregoing modules may be built in or independent of a processor of a base station in a form of hardware, or may be stored in a terminal in a form of software, for example, in a memory of UE, so as to be invoked by a processor to execute operations corresponding to the foregoing modules. The processor may be a central processing unit (CPU), a microprocessor, a single-chip microcomputer, or the like. The terminal shown in FIG. 14 can execute corresponding steps in the foregoing embodiment. For details, reference may be made to the description of the foregoing embodiment. For an achieved effect, reference may also be made to the description of the foregoing embodiment.

In this embodiment of the present invention, the storage module stores an override identifier sent by a wireless access network device; and the processing module establishes an RRC connection after the access layer determines that the override identifier stored by the storage module is overriding an ACB check, or starts an ACB check after the access layer determines that the override identifier stored by the storage module is not overriding an ACB check, and establishes an RRC connection after the ACB check is passed. Therefore, in some special cases, even if the terminal cannot pass the ACB check, the terminal can still perform services of some particular applications (for example, a disaster information bulletin board service).

Figure 15:
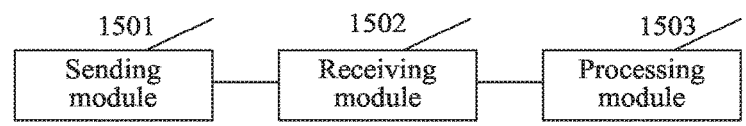
FIG. 15 is a schematic structural diagram of another embodiment of a terminal.

FIG. 15 is a terminal according to another embodiment of the present invention. The terminal includes a sending module 1501, configured to send, by an access layer, an ACDC check starting notification, a receiving module 1502, configured to: after an initiated service passes an ACDC check, receive, by the access layer, an RRC establishment request, where the RRC establishment request carries an override identifier corresponding to an application identifier of the service passing the ACDC check, and a processing module 1503, configured to: after the access layer determines that the override identifier received by the receiving module is overriding an ACB check, establish an RRC connection; or configured to: after the access layer determines that the override identifier received by the receiving module is not overriding an ACB check, start the ACB check, and establish an RRC connection after the ACB check is passed.

Optionally, the receiving module is further configured to receive, by the access layer, the ACDC check starting notification, a service list, and the override identifier that are sent by a wireless access network device; or receive, by the access layer, the ACDC check starting notification and the override identifier that are sent by a wireless access network device.

In this embodiment of the present invention, after an initiated service passes an ACDC check, the receiving module receives an RRC establishment request, where the RRC establishment request carries an override identifier corresponding to an application identifier of the service passing the ACDC check; and if determining that the override identifier received by the receiving module is overriding an ACB check, the processing module establishes an RRC connection. Therefore, in some special cases, even if the terminal cannot pass the ACB check, the terminal can still perform services of some particular applications (for example, a disaster information bulletin board service).

During hardware implementation, the foregoing modules may be built in or independent of a processor of a base station in a form of hardware, or may be stored in a terminal in a form of software, for example, in a memory of UE, so as to be invoked by a processor to execute operations corresponding to the foregoing modules. The processor may be a central processing unit (CPU), a microprocessor, a single-chip microcomputer, or the like. The terminal shown in FIG. 15 can execute corresponding steps in the foregoing embodiment. For details, reference may be made to the description of the foregoing embodiment. For an achieved effect, reference may also be made to the description of the foregoing embodiment.

Figure 16:
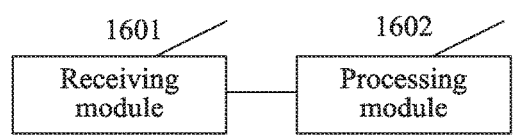
FIG. 16 is a schematic structural diagram of another embodiment of a terminal.

FIG. 16 is a terminal according to another embodiment of the present invention. The terminal includes a receiving module 1601, configured to receive, by an access layer, an ACDC check starting notification, where the receiving module is configured to receive, by the access layer, an RRC establishment request message, and a processing module 1602, configured to: if the RRC establishment request message received by the receiving module carries an indication of not performing an ACB check, establish, by the access layer of the terminal, an RRC connection, or configured to: if the RRC establishment request message received by the receiving module carries an indication of performing an ACB check, perform, by the access layer of the terminal, an ACB check, and establish an RRC connection after the ACB check is passed.

In this embodiment of the present invention, after an initiated service passes an ACDC check, an RRC establishment request message received by the access layer carries an indication of not performing an ACB check, and the access layer of the terminal establishes an RRC connection. Therefore, in some special cases, even if the terminal cannot pass the ACB check, the terminal can still perform services of some particular applications (for example, a disaster information bulletin board service).

Figure 17:
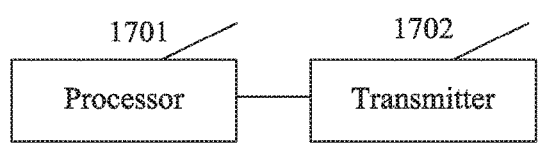
FIG. 17 is a schematic structural diagram of another embodiment of a terminal.

FIG. 17 is a terminal according to another embodiment of the present invention. The terminal includes a processor 1701, configured to obtain, by a protocol-stack upper layer, an override identifier, where the processor 1701 is configured to start, by the protocol-stack upper layer, an application specific congestion control for data connectivity ACDC check according to a service initiated by the terminal, and the processor 1701 is configured to confirm, by the protocol-stack upper layer, that the service initiated by the terminal can pass the ACDC check, and determine that the obtained coverage identifier corresponding to an application identifier of the service passing the ACDC check is overriding an access class barring ACB check, and a transmitter 1702, configured to: after the processor determines that the override identifier is overriding the access class barring ACB check, send, by the protocol-stack upper layer, an RRC establishment request message to an access layer of the terminal, where the request message carries an indication of not performing an ACB check, where the processor 1701 is configured to confirm, by the protocol-stack upper layer, that the service initiated by the terminal can pass the ACDC check, and determine that the obtained coverage identifier corresponding to the application identifier of the service passing the ACDC check is not overriding the ACB check; and the transmitter 1702 is configured to: after the processor determines that the override identifier is not overriding the ACB check, send, by the protocol-stack upper layer, an RRC establishment request message to the access layer of the terminal, so that the access layer establishes an RRC connection after confirming the ACB check.

In this embodiment of the present invention, the protocol-stack upper layer confirms, according to an obtained coverage identifier, that a service initiated by the terminal can pass the ACDC check, and determines that the override identifier that corresponds to an application identifier of the service passing the ACDC check and is obtained by the obtaining module is overriding an access class barring ACB check. Therefore, in some special cases, even if the terminal cannot pass the ACB check, the terminal can still perform services of some particular applications (for example, a disaster information bulletin board service).

The processor is specifically configured to receive, by the protocol-stack upper layer, an override identifier sent by a core network device; or receive, by the protocol-stack upper layer, a service list sent by a core network device, where the service list carries an override identifier; or receive, by the protocol-stack upper layer, a service list sent by the access layer of the terminal, where the service list carries an override identifier; or receive, by the protocol-stack upper layer, an override identifier, which is sent by the wireless access network device by using the access layer of the terminal; or obtain, by the protocol-stack upper layer, a locally configured coverage identifier; or obtain, by the protocol-stack upper layer, a locally configured service list, where the service list carries an override identifier.

Further, the processor is further configured to determine, by the protocol-stack upper layer according to the obtained coverage identifier corresponding to the application identifier of the service passing the ACDC check, whether the ACB check needs to be performed.

Further, the terminal further includes a receiver, configured to receive, by the protocol-stack upper layer, a system broadcast message sent by the access layer of the terminal, and notify the protocol-stack upper layer of the terminal of starting the ACDC check, where the system broadcast message is sent by the wireless access network device after the wireless access network device learns that the wireless access network device and/or the core network device is congested, and starts the ACDC check; or receive, by the protocol-stack upper layer, dedicated signaling sent by the access layer of the terminal, and notify the protocol-stack upper layer of the terminal of starting the ACDC check, where the dedicated signaling is sent by the wireless access network device after the wireless access network device learns that the wireless access network device and/or the core network device is congested, and starts the ACDC.

Figure 18:
FIG. 18 is a schematic structural diagram of another embodiment of a terminal.

FIG. 18 is a terminal according to another embodiment of the present invention. The terminal includes a memory 1801, configured to store, by an access layer, an override identifier sent by a wireless access network device, a transmitter 1802, configured to send, by the access layer, an ACDC check starting notification, a receiver 1803, configured to: after a service initiated by the terminal passes an ACDC check, receive, by the access layer, an RRC establishment request, and a processor 1804, configured to: after the access layer determines that the override identifier stored by the memory is overriding an ACB check, establish an RRC connection; or configured to: after the access layer determines that the override identifier stored by the memory is not overriding an ACB check, start the ACB check, and establish an RRC connection after the ACB check is passed.

In this embodiment of the present invention, the access layer stores an override identifier sent by a wireless access network device; and after a service initiated by the terminal passes an ACDC check, the access layer receives an RRC establishment request, which is used to establish an RRC connection after the access layer determines that the override identifier stored by the storage module is overriding an ACB check. Therefore, in some special cases, even if the terminal cannot pass the ACB check, the terminal can still perform services of some particular applications (for example, a disaster information bulletin board service).

Further, the receiver is further configured to receive, by the access layer, the ACDC check starting notification, a service list, and the override identifier that are sent by the wireless access network device; or receive, by the access layer, the ACDC check starting notification and the override identifier that are sent by the wireless access network device.

Figure 19:
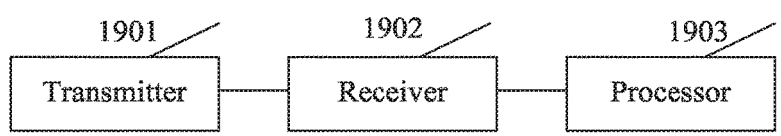
FIG. 19 is a schematic structural diagram of another embodiment of a terminal.

FIG. 19 is a terminal according to another embodiment of the present invention. The terminal includes a transmitter 1901, configured to send, by an access layer, an ACDC check starting notification, a receiver 1902, configured to: after an initiated service passes an ACDC check, receive, by the access layer, an RRC establishment request, where the RRC establishment request carries an override identifier corresponding to an application identifier of the service passing the ACDC check, and a processor 1903, configured to: after the access layer determines that the override identifier received by the receiver is overriding an ACB check, establish an RRC connection; or configured to: after the access layer determines that the override identifier received by the receiver is not overriding an ACB check, start the ACB check, and establish an RRC connection after the ACB check is passed.

In this embodiment of the present invention, after an initiated service passes an ACDC check, the access layer receives an RRC establishment request, where the RRC establishment request carries an override identifier corresponding to an application identifier of the service passing the ACDC check. Therefore, in some special cases, even if the terminal cannot pass the ACB check, the terminal can still perform services of some particular applications (for example, a disaster information bulletin board service).

Further, the receiver is further configured to receive, by the access layer, the ACDC check starting notification, a service list, and the override identifier that are sent by a wireless access network device; or receive, by the access layer, the ACDC check starting notification and the override identifier that are sent by a wireless access network device.

Figure 20:
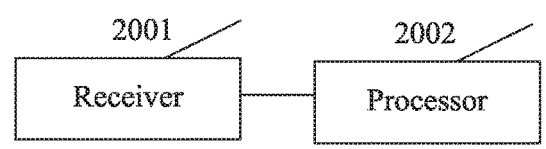
FIG. 20 is a schematic structural diagram of another embodiment of a terminal.

FIG. 20 is a terminal according to another embodiment of the present invention. The terminal includes a receiver 2001, configured to receive, by an access layer, an ACDC check starting notification, where the receiver 2001 is configured to receive, by the access layer, an RRC establishment request message, and a processing module 2002, configured to: if the RRC establishment request message received by the receiver carries an indication of not performing an ACB check, establish, by the access layer of the terminal, an RRC connection; or configured to: if the RRC establishment request message received by the receiver carries an indication of performing an ACB check, perform, by the access layer of the terminal, an ACB check, and establish an RRC connection after the ACB check is passed.

In this embodiment of the present invention, after an initiated service passes an ACDC check, an RRC establishment request message received by the access layer carries an indication of not performing an ACB check, and the access layer of the terminal establishes an RRC connection. Therefore, in some special cases, even if the terminal cannot pass the ACB check, the terminal can still perform services of some particular applications (for example, a disaster information bulletin board service).

It should be noted that the terminals shown in FIG. 17 to FIG. 20 can separately implement the methods provided for the terminals in the foregoing method embodiments. For details, reference may be made to the description of the foregoing embodiments. For an achieved effect, reference may also be made to the description of the foregoing embodiments.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An access control method, comprising:
   obtaining, by a terminal, an override identifier;
   determining, by the terminal, whether the override identifier is overriding an access class barring (ACB) check after a service initiated by the terminal passes an application specific congestion control for data connectivity (ACDC) check;
   establishing, by the terminal, a radio resource control (RRC) connection in response to the terminal determining that the identifier is overriding the ACB check; and
   starting, by the terminal, the ACB check in response to the terminal determining that the coverage identifier is not overriding the ACB check, and establishing, by the terminal, the RRC connection after the ACB check is passed.

2. The method according to claim 1, wherein the obtaining the override identifier, comprises:
   receiving, by the terminal, a system broadcast message from a wireless access network device, wherein the system broadcast message comprises the override identifier.

3. The method according to claim 2, wherein the system broadcast message further comprises a service list.

4. The method according to claim 1, wherein the terminal is in idle state.

5. An apparatus, comprising:
a processor; and
a computer-readable storage medium storing a program to be executed by the processor, the program including instructions to:
   obtain an override identifier;
   determine whether the override identifier is overriding an access class barring (ACB) check after a service passes an application specific congestion control for data connectivity (ACDC) check;
   establish a radio resource control (RRC) connection if the identifier is overriding the ACB check; and
   start the ACB check if the coverage identifier is not overriding the ACB check, and establish the RRC connection after the ACB check is passed.

6. The apparatus according to claim 5, wherein the apparatus further comprises a receiver,
   wherein the program further includes instructions to utilize the receiver to receive a system broadcast message from a wireless access network device, wherein the system broadcast message comprises the override identifier.

7. The apparatus according to claim 6, wherein the system broadcast message further comprises a service list.

8. A non-transitory computer-readable storage medium storing a program to be executed by a processor, the program including instructions for:
   obtaining an override identifier;
   determining whether the override identifier is overriding an access class barring (ACB) check after a service passes an application specific congestion control for data connectivity (ACDC) check;
   establishing a radio resource control (RRC) connection if the identifier is overriding the ACB check; and
   starting the ACB check if the coverage identifier is not overriding the ACB check, and establishing the RRC connection after the ACB check is passed.

9. The non-transitory computer-readable storage medium according to claim 8, wherein the instructions for obtaining an override identifier comprises instructions for:
   obtaining a system broadcast message, wherein the system broadcast message comprises the override identifier.

* * * * *